(12) United States Patent
Dariush

(10) Patent No.: US 7,774,177 B2
(45) Date of Patent: Aug. 10, 2010

(54) EXOSKELETON CONTROLLER FOR A HUMAN-EXOSKELETON SYSTEM

(75) Inventor: Behzad Dariush, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 1147 days.

(21) Appl. No.: 11/395,654

(22) Filed: Mar. 30, 2006

(65) Prior Publication Data

US 2006/0247904 A1 Nov. 2, 2006

Related U.S. Application Data

(63) Continuation-in-part of application No. 11/038,691, filed on Jan. 19, 2005, now Pat. No. 7,469,166, and a continuation-in-part of application No. 11/038,692, filed on Jan. 19, 2005, now Pat. No. 7,623,944, and a continuation-in-part of application No. 11/038,978, filed on Jan. 19, 2005, now Pat. No. 7,684,896, and a continuation-in-part of application No. 10/824,059, filed on Apr. 13, 2004, now Pat. No. 7,390,309, and a continuation-in-part of application No. 10/655,460, filed on Sep. 5, 2003, now Pat. No. 7,217,247, and a continuation-in-part of application No. 10/280,771, filed on Oct. 25, 2002, now Pat. No. 7,251,593, and a continuation-in-part of application No. 10/151,647, filed on May 16, 2002, now Pat. No. 7,135,003.

(60) Provisional application No. 60/667,518, filed on Apr. 1, 2005, provisional application No. 60/670,732, filed on Apr. 12, 2005, provisional application No. 60/330,689, filed on Oct. 29, 2001, provisional application No. 60/333,753, filed on Nov. 29, 2001, provisional application No. 60/413,024, filed on Sep. 23, 2002, provisional application No. 60/421,964, filed on Oct. 28, 2002, provisional application No. 60/484,708, filed on Jul. 3, 2003, provisional application No. 60/301,891, filed on Jun. 29, 2001, provisional application No. 60/353,378, filed on Jan. 31, 2002.

(51) Int. Cl.
*G06F 17/10* (2006.01)
*A61B 5/103* (2006.01)
*A61F 2/48* (2006.01)

(52) U.S. Cl. .................. 703/2; 703/7; 600/587; 600/595; 623/30; 623/48; 623/50; 623/57; 73/1.09; 73/862.08; 700/245; 700/247; 700/251; 700/260; 700/261; 700/262

(58) Field of Classification Search .................. 703/2, 703/7, 11; 600/587, 595; 623/24, 27, 48, 623/57–65, 30, 50; 700/245, 254, 260, 261, 700/247, 251, 262; 73/1.09, 862.08
See application file for complete search history.

(56) References Cited

U.S. PATENT DOCUMENTS 4,244,120 A 1/1981 Harris (Continued)

FOREIGN PATENT DOCUMENTS

EP 1422128 A 5/2004

(Continued)

OTHER PUBLICATIONS

K. Nagai, I. Nakanishi, T. Kishida, "Design of Robotic Orthosis Assisting Human Motion in Production Engineering and Human Care", ICORR'99, pp. 270-275.*

(Continued)

*Primary Examiner*—Kamini S Shah
*Assistant Examiner*—Kimrom Gebresilassie
(74) *Attorney, Agent, or Firm*—Fenwick & West LLP; Mark Duell

(57) ABSTRACT

Techniques are provided for controlling an exoskeleton actuator at a joint of a human-exoskeleton system by receiving system parameters for the human-exoskeleton system, receiving generalized coordinates for the human-exoskeleton system, and determining an equivalent joint torque for the exoskeleton actuator to compensate for a selected force. While providing partial or complete compensation of selected gravitational and external forces, one embodiment of the present invention mitigates the amount of interference between voluntary control and assist control, thereby allowing humans to quickly humans adapt to an exoskeleton system.

24 Claims, 8 Drawing Sheets

U.S. PATENT DOCUMENTS

| | | | |
|---|---|---|---|
| 4,786,847 | A | 11/1988 | Daggett et al. |
| 4,834,200 | A | 5/1989 | Kajita |
| 4,925,312 | A * | 5/1990 | Onaga et al. ............... 700/261 |
| 5,038,089 | A | 8/1991 | Szakaly |
| 5,044,360 | A | 9/1991 | Janke |
| 5,136,227 | A | 8/1992 | Nakano et al. |
| 5,203,346 | A | 4/1993 | Fuhr et al. |
| 5,247,432 | A | 9/1993 | Ueda |
| 5,323,549 | A | 6/1994 | Segel et al. |
| 5,362,288 | A | 11/1994 | Razon |
| 5,432,417 | A * | 7/1995 | Takenaka et al. ....... 318/568.12 |
| 5,459,659 | A * | 10/1995 | Takenaka ................. 700/260 |
| 5,476,441 | A * | 12/1995 | Durfee et al. ............... 602/23 |
| 5,570,286 | A | 10/1996 | Margolis et al. |
| 5,625,577 | A | 4/1997 | Kunii et al. |
| 5,659,480 | A * | 8/1997 | Anderson et al. ........... 700/186 |
| 5,706,589 | A | 1/1998 | Marc |
| 5,709,219 | A * | 1/1998 | Chen et al. ................ 600/595 |
| 5,808,433 | A * | 9/1998 | Tagami et al. ........ 318/568.12 |
| 5,835,693 | A * | 11/1998 | Lynch et al. ............... 345/473 |
| 5,894,205 | A * | 4/1999 | Shimizu et al. ............ 318/432 |
| 5,942,869 | A | 8/1999 | Katou et al. |
| 5,982,389 | A | 11/1999 | Guenter et al. |
| 6,045,524 | A | 4/2000 | Hayashi et al. |
| 6,076,025 | A | 6/2000 | Ueno |
| 6,152,890 | A | 11/2000 | Kupfer et al. |
| 6,161,080 | A | 12/2000 | Aouni-Ateshian et al. |
| 6,204,619 | B1 * | 3/2001 | Gu et al. ................. 318/568.11 |
| 6,222,338 | B1 * | 4/2001 | Villaret ................. 318/568.13 |
| 6,289,265 | B1 | 9/2001 | Takenaka et al. |
| 6,321,137 | B1 * | 11/2001 | De Smet .................. 700/245 |
| 6,445,983 | B1 | 9/2002 | Dickson et al. |
| 6,505,096 | B2 * | 1/2003 | Takenaka et al. ........... 700/245 |
| 6,580,969 | B1 | 6/2003 | Ishida et al. |
| 6,633,783 | B1 | 10/2003 | Dariush et al. |
| 6,640,160 | B2 | 10/2003 | Takahashi et al. |
| 6,750,866 | B1 | 6/2004 | Anderson, III |
| 6,766,204 | B2 | 7/2004 | Niemeyer et al. |
| 6,785,591 | B1 * | 8/2004 | Hansson .................. 700/275 |
| 6,845,295 | B2 * | 1/2005 | Cheng et al. ............... 700/245 |
| 6,915,150 | B2 | 7/2005 | Cinquin et al. |
| 6,943,520 | B2 | 9/2005 | Furuta et al. |
| 6,971,267 | B2 * | 12/2005 | Kawai et al. ............. 73/379.01 |
| 7,010,390 | B2 | 3/2006 | Graf et al. |
| 7,013,201 | B2 | 3/2006 | Hattori et al. |
| 7,024,279 | B2 | 4/2006 | Rose, III et al. |
| 7,112,938 | B2 | 9/2006 | Takenaka et al. |
| 7,135,003 | B2 | 11/2006 | Dariush |
| 7,184,858 | B2 | 2/2007 | Okazaki et al. |
| 7,191,036 | B2 * | 3/2007 | Takenaka et al. ........... 700/245 |
| 7,260,450 | B2 | 8/2007 | Okazaki et al. |
| 7,278,954 | B2 * | 10/2007 | Kawai et al. .................. 482/1 |
| 7,333,111 | B2 | 2/2008 | Ng-Thow-Hing et al. |
| 7,386,366 | B2 * | 6/2008 | Dariush .................... 700/245 |
| 7,390,309 | B2 * | 6/2008 | Dariush ...................... 601/5 |
| 7,402,142 | B2 * | 7/2008 | Kawai et al. ............... 600/587 |
| 7,431,707 | B2 * | 10/2008 | Ikeuchi .................... 602/16 |
| 7,603,234 | B2 | 10/2009 | Takenaka et al. |
| 7,646,161 | B2 * | 1/2010 | Albu-Schaffer et al. .. 318/568.2 |
| 7,650,204 | B2 * | 1/2010 | Dariush ..................... 700/245 |
| 2003/0018283 | A1 | 1/2003 | Dariush |
| 2003/0023415 | A1 | 1/2003 | Nakamura et al. |
| 2003/0115031 | A1 | 6/2003 | Dariush et al. |
| 2003/0223844 | A1 * | 12/2003 | Schiele et al. ................. 414/5 |
| 2004/0031169 | A1 | 2/2004 | Jensen et al. |
| 2004/0102723 | A1 | 5/2004 | Horst |
| 2004/0107780 | A1 * | 6/2004 | Kawai et al. ............. 73/862.08 |
| 2004/0158175 | A1 * | 8/2004 | Ikeuchi et al. ................. 601/5 |
| 2004/0176875 | A1 * | 9/2004 | Iribe et al. ................. 700/245 |
| 2004/0193318 | A1 | 9/2004 | Ito |
| 2004/0249319 | A1 * | 12/2004 | Dariush ........................ 601/5 |
| 2004/0254771 | A1 * | 12/2004 | Riener et al. ................. 703/7 |
| 2005/0070834 | A1 | 3/2005 | Herr et al. |
| 2005/0102111 | A1 * | 5/2005 | Dariush et al. ............... 702/41 |
| 2005/0104548 | A1 | 5/2005 | Takenaka et al. |
| 2005/0209535 | A1 * | 9/2005 | Dariush ..................... 600/595 |
| 2006/0046909 | A1 | 3/2006 | Rastegar et al. |
| 2006/0100818 | A1 | 5/2006 | Nakamura et al. |
| 2006/0139355 | A1 * | 6/2006 | Tak et al. ................... 345/473 |
| 2006/0173578 | A1 * | 8/2006 | Takenaka et al. ........... 700/245 |
| 2006/0293791 | A1 * | 12/2006 | Dariush ...................... 700/245 |
| 2007/0123997 | A1 * | 5/2007 | Herr et al. ................... 623/27 |
| 2008/0139968 | A1 * | 6/2008 | Endo et al. .................. 600/595 |

FOREIGN PATENT DOCUMENTS

| | | |
|---|---|---|
| JP | 2000-249570 | 9/2000 |
| RU | 2 107 328 C1 | 3/1998 |
| WO | WO 00/35346 | 6/2000 |
| WO | WO 03/002054 | 1/2003 |
| WO | WO 03/002967 | 1/2003 |

OTHER PUBLICATIONS

J. R. Asensio, L. Montano, "A Kinematic and Dynamic Model Based Motion Controller for mobile Robots", 2002 IFAC, pp. 1-6.*

"Berkeley Researchers Developing Robotic Exoskeleton That Can Enhance Human Strength and Endurance,"ScienceDaily LLC, 1995-2004, [online] [Retrieved on Oct. 9, 2006] Retrieved from the Internet<URL:http://bleex.me.berkeley.edu/bleexhistPDFs/sciencedaily.pdf>.

Durfee, W.K., "Preliminary Design and Simulation of a Pneumatic, Stored-Energy, Hybrid Orthosis for Gait Restoration," Proceedings of IMECE04, 2004 ASME International Mechanical Engineering Congress, Nov. 13-20, 2004, [online] [Retrieved on Oct. 9, 2006] Retrieved from the Internet<URL: http://www.me.umn.edu/~wkdurfee/publications/IMECE2004-60075.pdf >.

International Search Report and Written Opinion, PCT/US06/11727, Nov. 9, 2006, 9 pages.

Isaacs, P.M. et al., "Controlling Dynamic Simulation with Kinematic Constraints, Behavior Functions, and Inverse Dynamics," Computer Graphics, Jul. 1987, pp. 215-224, vol. 21, No. 4.

Madigan, R.R., "Ankle-Foot Orthoses (AFO's) in Spastic Cerebral Palsy," Fillauer LLC, [online] [Retrieved on Oct. 9, 2006] Retrieved from the Internet<URL:http://www.fillauer.com/education/ED_afo.html#dynamic>.

Pratt, G.A. et al., "Active Orthotics for Helping the Neuromuscularly Impaired to Walk," [online] [Retrieved on Oct. 9, 2006] Retrieved from the Internet<URL:http://www.vcl.uh.edu/~rcv03/materials/grant/9733740.1064791086.pdf>.

"Regenerative Foot Braking," [online] [Retrieved on Oct. 9, 2006] Retrieved from the Internet<URL:http://www.halfbakery.com/idea/regenerative_20foot_20braking#1069693200>.

"Sensorless Fet Element DC Motor Driver," [online] [Retrieved on Oct. 9, 2006] Retrieved from the Internet<URL:http://robotx.sourceforge.net/bridge/bridge.shtml>.

Trost, F.J., "Energy-Storing Feet," JACPOC, 1989, vol. 24, No. 4, [online] [Retrieved on Oct. 9, 2006] Retrieved from the Internet<URL:http://jacpoc.oandp.com/library/1989_04_082.asp>.

PCT International Search Report and Written Opinion, PCT/US06/14069, Aug. 31, 2007, 8 pages.

PCT International Search Report and Written Opinion, PCT/US06/01343, Aug. 15, 2007, 8 pages.

Bhushan, N., et al., "Computational nature of human adaptive control during learning of reaching movements in force fields," Biological Cybernetics, Jan. 26, 1999, p. 39-60, vol. 81.

Notice of Grounds for Rejection—Office Action, Japanese Patent Application No. 2003-508905, May 27, 2008, 9 Pages.

Supplementary European Search Report, European Patent Application No. EP 06750178, Apr. 21, 2008, 6 Pages.

Office Action, Canadian Patent Application No. 2,451,630, Jul. 22, 2008, 2 Pages.

Examination Report, European Patent Application No. EP 06748964, Jul. 22, 2008, 5 Pages.

First Office Action of the State Intellectual Property Office issued by the People's Republic of China, Application No. 200710110254.9, Jan. 16, 2009, 8 Pages.

Notice of Grounds for Rejection Office Action issued by the Japan Patent Office, Application No. 2003-508905, Oct. 14, 2008, 7 Pages.

Notice of Grounds for Rejection Office Action issued by the Japan Patent Office, Application No. 2007-552186, Jan. 6, 2009, 8 Pages.

Asensio, J., et al., "A Kinematic and Dynamic Model-Based Motion Controller for Mobile Robots," IFAC, 2002.

Wu, G., et al., "The Study of Kinematic Transient in Locomotion Using the Integrated Kinematic Sensor," IEEE, Sep. 1996, pp. 193-200, vol. 4, No. 3.

Notice of Preliminary Rejection, Korean Patent Application No. 10-2003-7017176, Mar. 12, 2008.

PCT International Search Report and Written Opinion, PCT/US06/01116, Jan. 17, 2008.

PCT International Search Report and Written Opinion, PCT/US06/01250, May 16, 2008.

Supplementary European Search Report, EP 06748964, Mar. 14, 2008.

Supplementary European Search Report, EP 06750178, Mar. 14, 2008.

Agarwal, S.K. et al., "Theory and Design of an Orthotic Device for Full or Partial Gravity-Balancing of a Human Leg During Motion," IEEE Transactions on Neural Systems and Rehabilitation Engineering, Jun. 2004, vol. 12, No. 2.

Akhlaghi, F. et al., "In-shoe Biaxial Shear Force Measurement: the Kent Shear System," Medical & Biological Engineering & Computing, Jul. 1996, vol. 34, pp. 315-317.

Anderson, Frank C., "Static and Dynamic Optimization Solutions for Gait are Practically Equivalent", Journal of Biomechancis, 2001, vol. 34, pp. 153-161.

Anderson, F. et al., "Dynamic Optimization of Human Walking," *Journal of Biomechanical Engineering*, Oct. 2001, vol. 123, pp. 381-390.

Anderssen, R. et al., "Numerical Differentiation Procedures for Non-Exact Data," Numererische Mathematik, 1974, vol. 22, pp. 157-182.

Atkeson, C.G., "Learning Arm Kinematics and Dynamics", Annual Reviews, Inc., 1989, vol. 12, pp. 157-183.

Baruh, H., Analytical *Dynamics*, Chapter 7, Rigid Body Kinematics, McGraw-Hill, 1999, pp. 355-371.

Blaya, J., "Force-Controllable Ankle Foot Orthosis (AFO) to Assist Drop Foot Gait," Feb. 2003, web.mit.edu/jblaya/www/MSthesis_final.pdf.

Bronzino, J.D., ed., "The Biomedical Engineering Handbook", IEEE Press, $2^{nd}$ Ed. vol. 2, 2000, Chapter 142, pp. 1-17.

Burdea, G. et al., "Virtual Reality Technology", 1994, pp. 33-37, John Wiley and Sons, Inc.

Busby, H.R. et al., "Numerical Experiments With a New Differentiation Filter," Transactions of the ASME—Journal of Biomechanical Engineering, Nov. 1985, vol. 107, pp. 293-299.

Chao, E.Y. et al., "Application of Optimization Principles in Determining the Applied Moments in Human Leg Joints During Gait," J. Biomechanics, 1973, vol. 6, pp. 497-510, Pergamon Press, Great Britain.

Craig, J.J., "Nonlinear Control of Manipulators," Introduction to Robotics Mechanics and Control, $2^{nd}$. Ed., 1989, Chapter 10, pp. 333-361.

Crowninshield, R.D. et al., "A Physiologically Based Criterion of Muscle Force Prediction in Locomotion," *Journal of Biomechanics*, vol. 14, No. 11, 1981, pp. 793-801.

Cullum, J., "Numerical Differentiation and Regularization," SIAM J. Numer. Anal., Jun. 1971, vol. 8, No. 2, pp. 254-265.

Dariush, B. et al., "Multi-Modal Analysis of Human Motion From External Measurements," Transactions of the ASME, Jun. 2001, vol. 123, pp. 272-278.

Dariush, B, "A Novel Algorithm for Generating a Forward Dynamics Solution to the Traditional Inverse Dynamics Problem," In *4th World Congress of Biomechanics*, Calgary, Canada, 2002.

Dariush, B., "A Forward Dynamics Solutions to Multi-Modal Inverse Dynamics Problems," In *International Society of Biomechanics, XIXth Congress*, Dunedin, NZ, 2003.

Dariush, B., "A Well-Posed, Embedded Constraint Representation of Joint Moments From Kinesiological Measurements," Journal of Biomechanical Engineering, Aug. 2000, vol. 122, pp. 437-445.

Delp, S. et al., "A Computational Framework for Simulating and Analyzing Human and Animal Movement," *IEEE Computing in Science and Engineering*; vol. 2, No. 5, 2000, pp. 46-55.

Dohrmann, C.R. et al., "Smoothing Noisy Data Using Dynamic Programming and Generalized Cross-Validation" Transactions of the ASME—Journal of Biomechanical Engineering, Feb. 1988, vol. 110, pp. 37-41.

Flanagan, R.J., et al., "The Role of Internal Models in Motion Planning and Control: Evidence from Grip Force Adjustments During Movements of Hand-Held Loads", The Journal of Neuroscience, Feb. 15, 1997, vol. 17(4), pp. 1519-1528.

Gagnon, D. et al., "The Influence of Dynamic Factors on Triaxial Net Muscular Moments at the L5/S1 Joint During Asymmetrical Lifting and Lowering", Journal of Biomechanics, vol. 25, pp. 891-901, 1992.

Gagnon, M. et al., "Muscular Mechanical Energy Expenditure as a Process for Detecting Potential Risks in Manual Materials Handling," J. Biomech., Nov. 1991, pp. 191-203, vol. 24, No. 3/4.

Giakas, G. et al., "A Comparison of Automatic Filtering Techniques Applied to Biomechanical Walking Data," J. Biomechanics 1997, vol. 00, No. 00, 4 pages.

Giakas, G. et al., "Optimal Digital Filtering Requires a Different Cut-Off Frequency Strategy for the Determination of the Higher Derivatives," J. Biomechanics, Apr. 1997, vol. 28, No. 00, 5 pages.

Grood, E.S. et al., "A Joint Coordinate System for the Clinical Description of Three Dimensional Motions: Application to the Knee," Journal of Biomechanical Engineering, 1983, pp. 136-144, No. 105.

Gruber, K., et al., "A Comparative Study of Impact Dynamics: Wobbling Mass Model Versus Rigid Body Models", Journal of Biomechanics, 31 (1998), pp. 439-444.

Hatze, H. "The Use of Optimally Regularized Fourier Series for Estimating Higher-Order Derivatives of Noisy Biomechanical Data," J. Biomechanics, 1981, vol. 14, pp. 13-18.

Hayashibara, Y. et al., "Design of a Power Assist System with Consideration of Actuator's Maximum Torque," $4^{th}$ IEEE International Workshop on Robot and Human Communication, RO-MAN'95, Tokyo, Jul. 5-7, 1995, pp. 379-384, [online] Retrieved from the Internet<URL:http://ieeexplore.ieee.org/xpl/abs_free.jsp?arNumber=531990>.

Hemami, H., "A Feedback On-Off Model of Biped Dynamics", IEEE Transactions on Systems, Man, and Cybernetics, Jul. 1980, vol. SMC-10, No. 7, pp. 376-383.

Hemami, H. et al., "Modeling and Control of Constrained Dynamic Systems With Application to Biped Locomotion in the Frontal Plane," *IEEE Transactions on Automatic Control*, vol. 4, No. 4, Aug. 1979, pp. 526-535.

Hemami, H., "A State Space Model for Interconnected Rigid Bodies," IEEE Trans. on Automatic Control, 1982, pp. 376-382, vol. 27, No. 2.

Hosein, R. et al., "A Study of In-shoe Plantar Shear in Normals," Clinical Biomechanics, 2000, vol. 15, pp. 46-53.

Hsiang, S.H. et al., "Three Different Lifting Strategies for Controlling the Motion Patterns of the External Load", Ergonomics, vol. 40, pp. 928-939, 1997.

Hungspreugs, P. et al., "Muscle Force Distribution Estimation Using Static Optimization Techniques", Technical Report—Honda R&D Americas.

Jalics, L. et al., "A Control Strategy for Terrain Adaptive Bipedal Locomotion," Autonomous Robots, 1997, pp. 243-257, vol. 4.

Jezernk, S. et al., "Robotic Orthosis Lokomat: A Rehabilitation and Research Tool," Neuromodulation, 2003, pp. 108-115, vol. 6, No. 2.

Kato, H. et al., "The Concept of a Walking Assistance Suit", The Japanese Society of Mechanical Engineers, Aug. 2001.

Kawato, M., "Adapation and Learning in Control of Voluntary Movement by the Central Nervous System", 1989, Advanced Robotics, vol. 3, pp. 229-249.

Kawato, M., et al., "The Cerebellum and VOR/OKR Learning Models", Elsevier Science Publishers Ltd., 1992, vol. 15, No. 11, pp. 445-453.

Kawato, M., "Internal Models for Motor Control and Trajectory Planning," Current Opinion in Neurobiology, 1999, pp. 718-727, No. 9.

Khatib, O., A Unified Approach for Motion and Force Control of Robot Manipulators: The Operational Space Formulation, *IEEE Journal of Robotics and Automation*, RA-3(1), 1987, pp. 43-53.

Klein, C. A. et al., Review of Pseudoinverse Control for Use With Kinematically Redundant Manipulators, *IEEE Transactions on Systems, Man, and Cybernetics*, vol. 13, No. 2, 1983, pp. 245-250.

Park, J.H. et al., Biped Robot Walking Using Gravity-Compensated Inverted Pendulum Mode and Computed Torque Control, 1998 IEEE Conference on Robotics and Automation, May 16-20, 1998, pp. 2528-2533, vol. 4, [online] Retrieved from the Internet<URL:http://ieeexplore.ieee.org/xpl/abs_free.jsp?arNumber=680985>.

Piazza, S. et al, "Three-Dimensional Dynamic Simulation of Total Knee Replacement Motion During a Step-up Task," *Journal of Biomechanical Engineering*, vol. 123, 2001, pp. 599-606.

Rahman, T. et al., "A Simple Technique to Passively Gravity-Balance Articulated Mechanisms," Journal of Mechanical Design, 1995, pp. 655-658, vol. 117, No. 4.

Runge, C.F. et al., "Estimating Net Joint Torques From Kinesiological Data Using Optimal Linear System Theory." IEEE Transactions on Biomedical Engineering, Dec. 1995, vol. 42, No. 12, pp. 1158-1164.

Shadmehr, R. et al., "Interference in Learning Internal Models of Inverse Dynamics in Humans," Advances in Neural Information Processing Systems, 1995, pp. 1117-1224, Chapter 7.

Shadmehr, R., "Learning Virtual Equilibrium Trajectories for Control of a Robot Arm", Neural Computation, 1990, vol. 2, pp. 436-446.

Simons, W. et al., "Differentiation of Human Motion Data Using Combined Spline and Least Squares Concepts," Journal of Biomechanical Engineering, Transactions of the ASME, Aug. 1991, vol. 113, pp. 348-351.

Thelen, D. et al., "Generating Dynamic Simulations of Movement Using Computed Muscle Control," *Journal of Biomechanics*, 36, 2003, pp. 321-328.

Transmittal of the International Search Report, PCT/US02/20829, Dec. 12, 2002, 4 pages.

"Unsupported Standing with Minimized Ankle Muscle Fatigue," [online] Retrieved from the Internet<URL:http://ieeexplore.ieee.org/iel5/10/29163/01315854.pdf>.

Vaughan, C. L. et al., "Appendix B., Detailed Mathematics Used in GaitLab," *Dynamics of Human Gait*, Second Edition, Kiboho Publishers, Cape Town South Africa, 1999, pp. 83-106.

Vukobratovic, M. et al., *Scientific Fundamentals of Robotics 7: Biped Loco-motion*. Springer-Verlag, 1990, pp. 17-27.

Wells, R. et al., "Internal and Physiological Responses During Concentric and Eccentric Cyde Ergometry," Eur. J. Appl. Physiol., 1986, pp. 291-301, vol. 55.

Winter, D.A., "Biomechanics and Motor Control of Human Movement", $2^{nd}$ Edition, John Wiley & Sons, Inc., pp. 51-74.

Winter, D.A., "Kinetics: Forces and Moments of Force," Biomechanics and Motor Control of Human Movement, $2^{nd}$ Ed., New York, 1990, Chapter 4.

Wittenberg, J., *Dynamics of Systems of Rigid Bodies*, 1977, B.G. Teubner Stuttgart, 1977, pp. 29-30.

Wolpert, D.M., et al., "Ocular Limit Cycles Induced by Delayed Retinal Feedback", Experimental Brain Research, 1993, vol. 96, pp. 173-180.

Woltring, H.J., "A Fortran Package for Generalized, Cross Validatory Spline Smoothing and Differentiation," Adv. Eng. Software, 1986, vol. 8, No. 2, pp. 104-107.

Woltring, H.J., "On Optimal Smoothing and Derivative Estimation From Noisy Displacement Data in Biomechanics," Human Movement Science, vol. 4, 1985, pp. 229-245.

Written Opinion, PCT/IB02/04311, Feb. 20, 2003, 2 pages.

Zajac, F.E., "Muscle and Tendon Properties, Models, Scaling, and Application to Biomechancis and Motor Control", 1989, vol. 17, Issue 4, pp. 359-411.

Wyeth, G. F., et al., "Distributed Digital Control of a Robot Arm," Proceedings of the Australian Conference on Robotics and Automation (ACRA 2000), Aug. 30-Sep. 1, 2000, pp. 217-222, [online] [retrieved on Dec. 31, 2006] Retrieved from the Internet: <URL: www.itee.uq.edu.au/~wyeth/Publications/puma.PDF>.

PCT International Search Report and Written Opinion, PCT/US06/22582, Feb. 2, 2007, 8 pages.

PCT International Search Report and Written Opinion, PCT/US05/11908, Mar. 8, 2007, 7 pages.

Second Office Action, Canadian Patent Application No. 2,451,630, Aug. 28, 2009, 2 Pages.

* cited by examiner

EXOSKELETON CONTROLLER FOR A HUMAN-EXOSKELETON SYSTEM

CROSS-REFERENCE TO RELATED APPLICATIONS

The application claims priority under 35 U.S.C §119(e) from U.S. provisional applications No. 60/667,518 filed on Apr. 1, 2005 and No. 60/670,732 filed on Apr. 12, 2005, which are all incorporated by reference herein in their entirety.

The application is a continuation-in-part of U.S. patent application Ser. No. 10/280,771 filed on Oct. 25, 2002 now U.S. Pat. No. 7,251,593, which claims priority under 35 U.S.C §119(e) from U.S. provisional applications No. 60/330,689 filed on Oct. 29, 2001 and No. 60/333,753 filed on Nov. 29, 2001, which are all incorporated by reference herein in their entirety. The application is a continuation-in-part of U.S. patent application Ser. No. 10/655,460 filed on Sep. 5, 2003 now U.S. Pat. No. 7,217,247, which claims priority under 35 U.S.C §119(e) from U.S. provisional applications No. 60/413,024 filed on Sep. 23, 2002 and No. 60/421,964 filed on Oct. 28, 2002 and No. 60/484,708 filed on Jul. 3, 2003, which are all incorporated by reference herein in their entirety. This application is a continuation-in-part of U.S. patent application Ser. No. 10/151,647 filed on May 16, 2002 which claims priority under 35 U.S.C §119(e) from U.S. provisional applications No. 60/301,891 filed on Jun. 29, 2001 and No. 60/353,378 filed on Jan. 31, 2002 which are all incorporated by reference herein in their entirety. This application is a continuation-in-part of U.S. patent application Ser. No. 10/824,059 filed on Apr. 13, 2004, now U.S. Pat. No. 7,390,309, which is incorporated by reference herein in its entirety. This application is a continuation-in-part of U.S. patent application Ser. No. 11/038,691 filed on Jan. 19, 2005, now U.S. Pat. No. 7,469,166, which is incorporated by reference herein in its entirety. This application is a continuation-in-part of U.S. patent application Ser. No. 11/038,692 filed on Jan. 19, 2005, now U.S. Pat. No. 7,623,944 which is incorporated by reference herein in its entirety. This application is a continuation-in-part of U.S. patent application Ser. No. 11/038,978 filed on Jan. 19, 2005, now U.S. Pat. No. 7,684,896, which is incorporated by reference herein in its entirety.

FIELD OF THE INVENTION

The present invention relates to control of a human-exoskeleton system.

BACKGROUND OF THE INVENTION

Exoskeletons are structures of rigid links mounted on a body that restore, rehabilitate, or enhance the human motor function. Effective use of exoskeletons for restoration or enhancement of motor function has potentially widespread applications in areas such as rehabilitation robotics, injury prevention, performance enhancement, and in helping humans with disabilities or compromised neuromuscular function. However, conventional exoskeleton systems are at an early stage of development, with some progress having been made in the field of rehabilitation. See Saso Jezernik, Gery Colombo, Thierry Keller, Hansruedi Frueh, and Manfred Morari, Robotic orthosis Lokomat: A rehabilitation and research tool, Neuromodulation, 6(2): 108-115, 2003, which is incorporated by reference herein in its entirety. Conventional techniques for human-exoskeleton control tend to rely on unreliable calculation of first and second order time derivatives of noisy generalized coordinates. Conventional exoskeleton controllers are also susceptible to uncertainties in measurement of body parameters such as body segment mass, center of mass, and length.

The complexity of the central nervous system (CNS) control and the interface between voluntary control and external artificial control presents significant obstacles to the control of a human-exoskeleton system. When humans interact with an external force field such as an exoskeleton, the central nervous system needs to learn an internal model of the force field and interaction with the force field. See R. Shadmehr, T. Brashers-Krug, and F. Mussa-Ivaldi, Interference in learning internal models of inverse dynamics in humans, in G. Tesauro, D. S. Touretsky, and T. K. Leen, eds., Advances in Neural Information Processing Systems, chapter 7, pages 1117-1224, MIT Press, 1995, which is incorporated by reference herein in its entirety. Therefore, a major challenge in the design and use of exoskeletons for daily activities relates to the coupled control of a human-exoskeleton system.

Another challenge to designing an exoskeleton controller is that an expected trajectory is not available to the controller because the intended human motion cannot be predicted in advance by an exoskeleton controller. Human motion generally takes place in a dynamic environment and forces that will act on a body are also unpredictable. The inability to predict the intended motion in addition to interaction with uncertain dynamic environments creates a need for online or real-time control of a human-exoskeleton system.

The coupled control of a human-exoskeleton system may lead to mechanical and metabolic inefficiencies if the assist controller is not properly designed. For example, an exoskeleton controller may degrade efficiency for certain tasks in which the natural and passive dynamics of the system help the progression of motion. Efficiencies due to the natural dynamics are evident in human gait motion, which is believed to be a highly efficient motion due to the passive transfer of potential to kinetic energy, with the primary source of energy for hip flexion during the swing phase of gait being generated by gravity effects. An exoskeleton control strategy should be mechanically and metabolically efficient. Accordingly, there is a need to assess the mechanical and metabolic costs associated with an exoskeleton controller and to determine its feasibility in terms of energy efficiency.

For a human-exoskeleton system, there is a need for exoskeleton control strategies that enhance, rehabilitate and restore the human motor function without the errors caused by calculation of higher order derivatives of kinematic data with noise. There is a need for exoskeleton controllers that are compatible with complex voluntary control performed by the central nervous system and that are capable of energy efficient, real-time control.

SUMMARY OF THE INVENTION

One embodiment of the present invention provides a method of controlling an exoskeleton actuator at a joint of a human-exoskeleton system. The method comprises receiving system parameters for the human-exoskeleton system, receiving generalized coordinates for the human-exoskeleton system, and determining an equivalent joint torque for the exoskeleton actuator to compensate for a selected force. According to one embodiment of the present invention, the control torque required to generate motion is relegated to muscles actuators that are activated by voluntary commands from the central nervous system, thereby mitigating the amount of interference between voluntary control and assist control and allowing humans to quickly adapt to an exoskeleton system. Techniques presented herein advantageously provide for efficient, real-time exoskeleton control without the errors caused by calculation of higher order derivatives of noisy kinematic data.

Forces selected for compensation can include gravitational forces as well as external forces, which can be acting on a body segment that may or may not be connected to the actuated joint. One embodiment of the present invention compensates for gravitational and/or external forces by determining an equivalent joint torque required to maintain static equilibrium. A further embodiment determines the equivalent joint torque for partial compensation of selected forces for one or more degrees of freedom.

According to one embodiment of the present invention, an equivalent joint torque for selective compensation of one or more forces can be determined using recursive techniques. According to another embodiment, an equivalent joint torque for selective-compensation of one or more forces can be determined using the principal of virtual work. For example, a Jacobian matrix can be used to transform a force to an equivalent joint torque. According to yet another embodiment, an equivalent joint torque can be determined by using one of several methods such as Lagrangian dynamics.

One embodiment of the present invention provides techniques to determine the feasibility of exoskeleton control in terms of metabolic or mechanical efficiency. Further, simulation results are presented to demonstrate the efficacy of one embodiment of the present invention when applied to control an active ankle-foot orthosis.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE PREFERRED EMBODIMENTS

Figure 1:
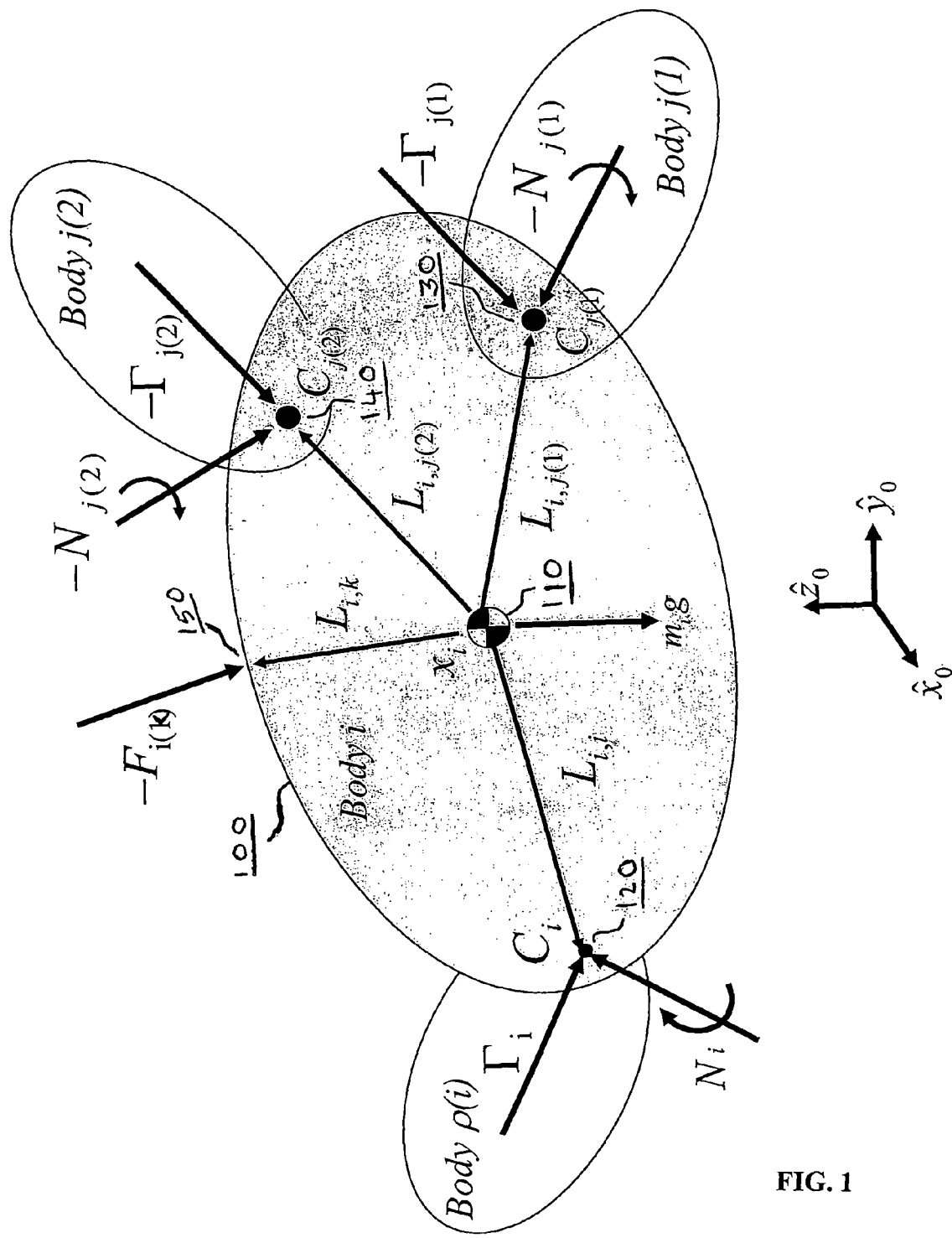
FIG. 1 is a free body diagram of forces and moments acting on a three-dimensional human-exoskeleton system with a tree structure according to one embodiment of the present invention.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Various embodiments of the present invention provide for determining an equivalent joint torque for selective compensation of gravitational and external forces in a human-exoskeleton system. Various embodiments of the present invention provide for selective force compensation using Lagrangian dynamics, the principle of virtual work, and recursive techniques. Which of these techniques is used for determining an equivalent joint torque may depend, for example, on the computational cost for a particular application for which the invention is used or the simplicity of the formulation for the particular application.

According to one embodiment of the present invention, control of a human-exoskeleton system can be relegated into two control subsystems: exoskeleton control and Central Nervous System (CNS) control. The exoskeleton control subsystem can be responsible for computing an equivalent joint torque required to selectively compensate for gravity and/or external forces. According to one embodiment, the equivalent joint torque computed by the exoskeleton control system does not account for generating the control commands to produce the intended motion. Compensation for gravity forces is important because a large component of muscle torques required to execute many tasks is due to compensation for gravitational loads from the body segments. For example, the ankle joint muscles may need to accommodate nearly the entire body weight in order to keep balance. In additional to gravity forces due to body segments, a human-exoskeleton system is subjected to external forces such as interaction forces arising from human-exoskeleton interaction, contact forces with the environment, reaction forces, applied forces, and gravitational forces due to loads (e.g. a backpack) external to the human body. External forces or their components are often known or may be reliably measured. For example, the vertical component of a ground reaction force is a type of external constraint force that can be reliably measured using in-shoe pressure/force sensors. According to one embodiment, if all gravitational forces and external forces are compensated, the exoskeleton controller can be viewed as a compensator that maintains the system in static equilibrium. According to another embodiment, if only forces due to gravity are compensated, the exoskeleton assist actuators compensate for the rate of change in potential energy.

An exoskeleton controller that performs selective compensation for gravity and external forces leaves the CNS control to execute commands that produce the muscle forces required to compensate for the remaining static and kinetic components of motion. The relegation of control according to one embodiment of the present invention leaves the responsibility of motion execution to the CNS/musculoskeletal system while the exoskeleton controllers and actuators contribute, at least in part, to maintaining static equilibrium. Such a partitioning into kinetic energy and partial potential energy components has important implications in motor learning. When humans interact with an external force field such as an exoskeleton, the central nervous system needs to learn an internal model of the force field and the interaction with that force field. See R. Shadmehr, T. Brashers-Krug, and F. Mussa-Ivaldi, Interference in learning internal models of inverse dynamics in humans, in G. Tesauro, D. S. Touretsky, and T. K. Leen, editors, Advances in Neural Information Processing Systems, chapter 7, pp. 1117-1224, MIT Press, 1995, which is incorporated by reference herein in its entirety. By partitioning the human and exoskeleton control to the corresponding kinetic and potential energy, one embodiment of the present invention mitigates the amount of interference between voluntary control and assist control, and minimizing such interference plays an important role in how quickly humans can adapt to interaction with the exoskeleton. Accordingly, one embodiment of the present invention provides a clear partition between natural voluntary control by the CNS, and artificial assist by the exoskeleton controller.

Human-Exoskeleton System

A general human-exoskeleton system with a tree structure has N segments, numbered $i=1 \ldots N$ and a total of n degrees of freedom, numbered $d=1 \ldots n$. Segments can also be referred to as links. The system can have a fixed or moving base, which can be considered the root node and which can be numbered segment 0. A set of N joints connect between the segments so that joint i connects segment $p(i)$ to segment i, where $p(i)$ is the link number of the parent of link i in the human-exoskeleton system. According to one embodiment, segment numbers can be chosen so that $p(i)<i$. For example, in the special case of an unbranched kinematic chain, $p(i)=i-1$ and the segments and joints can be numbered consecutively from the base to the tip. Segment i can have a set of children defined by $c(i)=\{j\}$ according to equation 1.

$$c(i)=\{j|p(j)=i\} \qquad (1)$$

FIG. 1 is a free body diagram of forces and moments acting on an exemplary three-dimensional human-exoskeleton system with a tree structure according to one embodiment of the present invention. FIG. 1 shows an isolated body segment i 100, connected at joint $^{o}C_i$ 120 to a parent segment p(i). The position of segment i center of mass, referred to the base frame, is denoted by $x_i$ 110. Segment i has a set of children, described by c(i)={j} while only two children are depicted in FIG. 1 for purposes of illustration, one skilled in the art will recognize that a body segment may have more or less than two children. Vectors can be referred to the global coordinate system {O}, and the notation of leading superscript is used herein to indicate the referred frame. The joint center connecting segment i to its parent segment p(i) is described by vector $^{o}C_i$ 120. Similarly, the joint centers connecting segment i to its children segments c(i)={j} are described by vectors $^{o}C_{j(1)}$ 130, and $^{o}C_{j(2)}$ 140 respectively. The position vectors from the center of mass 110 to the joint centers are described by $^{o}L_{i,i}$ and $^{o}L_{i,j}$, respectively. The reaction force and moment couple exerted on segment i 100 by a parent segment is described by vectors $^{o}\Gamma_i$ and $^{o}N_i$, respectively. Similarly, the reaction force and moment couple exerted on segment i 100 by a child segment is defined by $-^{o}\Gamma_j$ and $-^{o}N_j$, respectively. Let $-^{o}F_{i(k)}$ be the $k_{th}$ external force/moment vector exerted on segment i 100 at a point 150 described by the vector $^{o}L_{i,k}$ from the segment center of mass 110.

A Human-Exoskeleton Controller Using the Dynamics Equations of Motion

Figure 2:
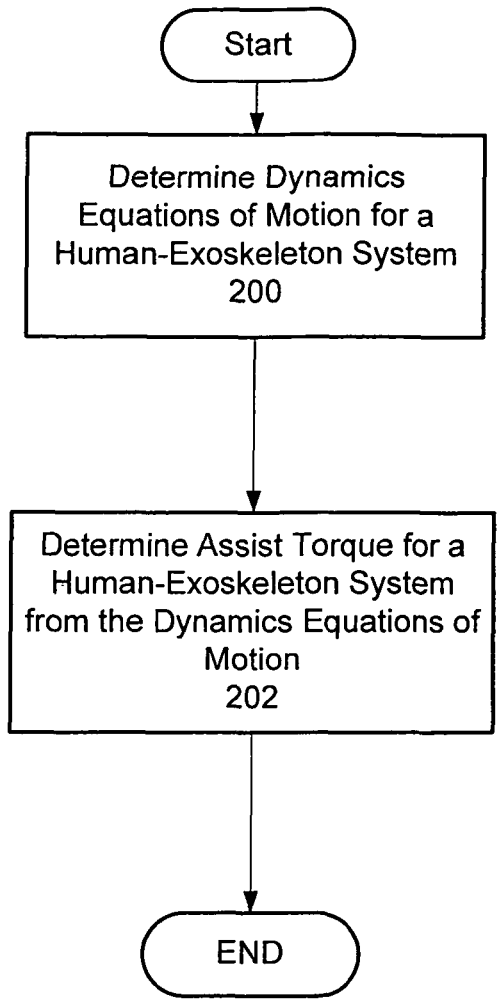
FIG. 2 is a flowchart illustrating a method of determining assist torque for a human-exoskeleton system from the dynamics equations of motion according to one embodiment of the present invention.

FIG. 2 is a flowchart illustrating a method of determining assist torque for a human-exoskeleton system from the dynamics equations of motion according to one embodiment of the present invention. The techniques described herein with reference to FIG. 2 can be applied to open kinematic chains as well as closed kinematic chains. The method starts by determining 200 dynamics equations of motion for a human-exoskeleton system. The equations of motion for the human exoskeleton system actuated by muscles spanning the joints and artificial assist actuators has the general form shown in equation 2.

$$M(q)\ddot{q}+H(q,\dot{q})\dot{q}+G(q)+T=\tau_m+\tau_a \quad (2)$$

In equation 2, the vector q represents the generalized coordinates, M is the inertia matrix, H describes the effects of the coriolis and centrifugal torques, and G is the vector of body segment gravitational torques. The vector T describes the torques due to external forces such as interaction forces arising from human-exoskeleton interaction, contact forces with the environment, reaction forces, applied forces, and gravitational forces due to loads (e.g. a backpack) external to the human body. Equation 2 provides the dynamics equations for a human-exoskeleton system having external forces, for example a system forming a closed kinematic chain, wherein T is not equal to zero. Alternatively, by setting T equal to zero, equation 2 can also provide the dynamics equations when there are no external forces.

According to one embodiment of the present invention, the dynamics in equation 2 does not include the effects of friction in actuators, passive dynamics of ligaments and tendons, and coupling dynamics of the human and exoskeleton. The right hand side of equation 2 represents the totality of all active torques at a joint, including torques generated from the voluntary contraction of muscle actuators, denoted by $\tau_m$, and torques generated from artificial actuators in an exoskeleton system, denoted by $\tau_a$ and referred to herein as assist torques, assist controls, actuator torques or equivalent joint torques. Their sum can be referred to as the net joint torque, $\tau_n$, as shown in equation 3. Note that the term torque, whether employed in the singular or plural, denotes a torque vector comprising one or more torques.

$$\tau_n=\tau_m+\tau_a \quad (3)$$

The computation of actuator controls from the system of equations 2 is inherently ill-posed because different combinations of muscle torques and assist torques can produce the same motion, or equivalently the same net joint torque. To resolve the redundancy, one embodiment of the present invention provides a control strategy that relegates human-exoskeleton control into two distinct subsystems: motion generation and equilibrium maintenance. According to one embodiment of the present invention, control of motion, also referred to as motion generation, is relegated to voluntary commands from the CNS, wherein the CNS can be assigned the role of issuing the commands to generate a desired motion. These commands are in the form of neural signals that activate the muscles to generate muscle torques required to produce a desired motion.

According to one embodiment of the present invention, the exoskeleton system's role is to generate joint torques required to maintain the human-exoskeleton system under static equilibrium. To generate joint torques required for static equilibrium, the exoskeleton system determines a set of torques, $T_a$, that will balance selected external forces and/or selected forces due to gravity. Inputs used to determine torques for equilibrium maintenance can include the configuration of the body segments and/or measurements of external forces.

According to one embodiment of the present invention, assist torques required to balance gravitational and/or external forces in a human-exoskeleton system can be determined 202 from the dynamics equations of motion. When there are no external forces (i.e. T=0 in equation 2), the rate of change of the total body segment potential energy with respect to the generalized coordinates describe the equilibrium condition to balance gravity. Under this condition, one embodiment of the present invention comprises a coupled human-exoskeleton control strategy that partitions the dynamics into kinetic energy components and potential energy components. The mathematical representation of this partitioning is given by equations 4 and 5.

$$\tau_a=G(q) \quad (4)$$

$$\tau_m=M(q)\ddot{q}+H(q,\dot{q})\dot{q} \quad (5)$$

Therefore, the control law for the assist torque $\tau_a$ in equation 4 negates the effects due to gravity, and we can refer to the control law of equation 4 as gravity compensation controller. According to one embodiment of the present invention, artificial actuators in a human-exoskeleton system can employ the control law in equation 4 to provide active gravity compensation.

According to another embodiment of the present invention, for a human-exoskeleton system with external forces, for example a system forming a closed kinematic chain, the equivalent joint torques required to compensate for gravity and external forces can be determined using equation 6.

$$\tau_a=G(q)+T \quad (6)$$

Selective Force Compensation using the Principle of Virtual Work

Equation 6 describes an assist control law that compensates for gravity and external forces according to one embodiment of the present invention. In practical applications, the vector $\tau_a$ can have one or more zero elements because not every degree of freedom is actuated in a human-exoskeleton system. Further, it is sometimes desirable for a human-exoskeleton system to provide partial compensation using an assist ratio that actuates a fraction of the gravitational or external forces acting on a system. Further still, it is sometimes desirable to determine an equivalent joint torque due to one or more specific Cartesian forces, such as specific external forces or gravitational forces due to specific body segments. One embodiment of the present invention determines equivalent joint torques for partial compensation of selected Cartesian forces for one or more actuated degrees of freedom using the principle of virtual work. The flexibility to selectively compensate for Cartesian forces has important implications for controller design that is mechanically and metabolically efficient.

Figure 3:
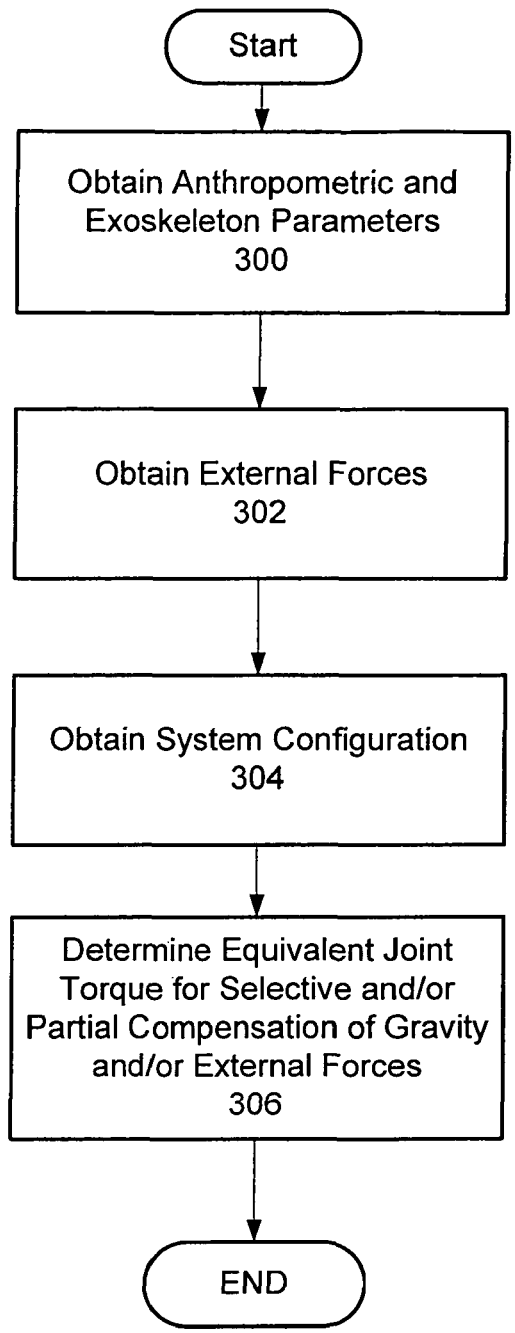
FIG. 3 is a flowchart illustrating a method of determining an equivalent joint torque for selective and/or partial compensation of gravity and external forces acting on a human-exoskeleton system using the principle of virtual work, according to one embodiment of the present invention.

FIG. 3 is a flowchart illustrating a method of determining an equivalent joint torque for selective and/or partial compensation of gravity and external forces acting on a human-exoskeleton system using the principle of virtual work, according to one embodiment of the present invention. The method described herein with reference to FIG. 3 can be applied to open kinematic chains as well as closed kinematic chains. The method obtains 300 anthropometric and exoskeleton parameters to determine the equivalent joint torque using the principle of virtual work. Anthropometric and exoskeleton parameters may include body segment center of mass locations, joint locations with respect to a body segment's center of mass, and a body segment's mass. If external forces are being compensated for, measurements of the selected external forces and application points of the external forces are obtained 302 at each instant in time. The current system configuration can be obtained 304 by measuring or estimating generalized coordinates of the human-exoskeleton system. For example, the configuration of required degrees of freedom can be obtained 304 at each instant in time, which can be used to perform online or real time control of a human-exoskeleton system. The equivalent joint torque for selective and/or partial compensation of gravity and/or external forces is obtained 306 by determining the equivalent joint torque to partially or completely compensate for one or more gravity forces, and determining the equivalent joint torque to partially or completely compensate for one or more external forces.

The control torque required to generate motion can be relegated to muscle actuators that are activated by voluntary commands from the central nervous system; therefore, according to one embodiment of the present invention determining 306 the equivalent joint torque for selective and/or partial compensation of gravity and/or external forces does not account for the control torque required to generate the motion.

A. Selective Compensation for Gravity Using the Principle of Virtual Work

According to one embodiment of the present invention, a method of determining an equivalent joint torque that partially or completely compensates for the effects of gravity due to one or more body segments of a human-exoskeleton system is explained with reference to equations 7-16. Referring to FIG. 1, let $x_i$ 110 be the position of segment i 100 center of gravity, referred to the base frame. Let $F_{cog_i}$ be the Cartesian gravity force acting at the center of gravity 110 of segment i 100, defined by equation 7.

$$F_{cog_i} = m_i g \tag{7}$$

In equation 7, $m_i$ is the segment mass of segment i 100 and $g = [0\ 0\ -9:81]^T$ is the vector representing the acceleration due to gravity referred to the global frame. The differential kinematics can be expressed by equation 8, wherein $q_n$ represents the generalized coordinate of degree of freedom n. Note that one or more of the partial derivatives $$\frac{\partial x_i}{\partial q_d}$$

(for d=1 ... n) on the right hand side of equation 8 can be zero, such as when the position $x_i$ is not a function of a particular value of $q_d$.

$$\dot{x}_i = \frac{\partial x_i}{\partial q_1} \dot{q}_1 + \frac{\partial x_i}{\partial q_2} \dot{q}_2 + \cdots + \frac{\partial x_i}{\partial q_n} \dot{q}_n \tag{8}$$

The vector form of equation 8 may be written as equation 9, where $J_{cog_i}$ is a jacobian matrix described by equation 10.

$$\dot{x}_i = J_{cog_i} \dot{q} \tag{9}$$

$$J_{cog_i} = \left[\frac{\partial x_i}{\partial q}\right] = \left[\frac{\partial x_i}{\partial q_1} \frac{\partial x_i}{\partial q_2} \cdots \frac{\partial x_i}{\partial q_n}\right] \tag{10}$$

According to one embodiment of the present invention, from the principle of virtual work, the Jacobian matrix may be used to relate Cartesian forces to equivalent joint torques. The torque vector required to balance the effects of gravity due to segment i 100 for all degrees of freedom can be determined using equation 11.

$$G_{(i)}^T = F_{cog_i}^T J_{cog_i} = m_i g^T \frac{\partial x_i}{\partial q} \tag{11}$$

According to one embodiment of the present invention, the scalar component of the gravity compensation torque in equation 11 can be determined for a particular degree of freedom d. To compute individual scalar torques corresponding to element number d of the vector $G^T(i)$, equation 11 simplifies to equation 12.

$$G_{(i,d)} = F_{cog_i}^T J_{(cog_{i,d})} = m_i g^T \frac{\partial x_i}{\partial q_d} \tag{12}$$

In equation 12, $J(cog_{i,d})$ corresponds to column number d of $J_{cog_i}$. While equations 11 and 12 provide the gravity compensation torque to balance the effects of gravity due to a single body segment i 110, it is further desirable to determine the joint torques required to balance the effects of gravity due to multiple body segments, which can be defined by the set μ. According to one embodiment of the present invention, equation 11 can be modified to determine the torque vector to balance the effects of gravity forces due to one or more segments described by the set μ, as shown in equation 13. For example, equation 13 with μ={1,3,5} determines the vector of equivalent joint torques required to balance the forces of gravity acting at the centers of mass of segments numbered 1, 3, and 5. One embodiment of the present invention performs selective compensation for gravitational forces, wherein set u includes a subset of the gravitational forces acting on the human-exoskeleton system that are selected for compensation.

$$G_{(\mu)}^T = \sum_{i \in \mu} F_{cog_i}^T J_{cog_i} = \sum_{i \in \mu} m_i g^T \frac{\partial x_i}{\partial q} \quad (13)$$

According to one embodiment of the present invention, the equivalent joint torque required to balance the gravitational forces acting at the centers of mass of all body segments of an N segment system, for example G(q) in equations 2, 4 and 6, can be determined using equation 13 by selecting $\mu=\{1, 2, \ldots, N\}$. According to another embodiment of the present invention, the equivalent joint torque required to balance the gravitational forces acting at the centers of mass of all body segments of a system can be determined using Lagrangian dynamics by taking the partial derivative of the total system potential energy function U, which is given by equation 14.

$$U = \sum_{i=1}^{N} m_i g^T x_i \quad (14)$$

One embodiment of the present invention determines the equivalent joint torque to partially compensate for gravitational forces at selected body segments. The vector $G_\mu$ has dimensions n×1, where each entry represents the torque required to balance gravitational forces of selected body segments at a particular degree of freedom. Let $T_{a,gr}$ be the n×1 vector of assist torques used to compensate for body segment gravitational forces. According to one embodiment, to compensate for gravity at every joint, the actuation system controls n degrees of freedom with the control law given by $T_{a,gr}=G_\mu$. According to another embodiment, not every degree of freedom is actuated because it is not always necessary to have a motorized actuator at every degree of freedom of every joint. Furthermore, for the actuated degrees of freedom, it may not be desirable to generate an assist torque that fully compensates for gravity. For these reasons, a more practical gravity compensation control can be achieved by pre-multiplying $G_\mu$ with a diagonal selection matrix $S_{gr}$, as shown in equations 15 and 16.

$$\tau_{a,gr} = S_{gr} G_\mu \quad (15)$$

$$S_{gr} = \begin{bmatrix} S_1 & 0 & 0 & 0 \\ 0 & S_2 & 0 & 0 \\ 0 & 0 & \ddots & 0 \\ 0 & 0 & 0 & S_n \end{bmatrix} \quad (16)$$

In one embodiment, the diagonal elements of $S_{gr}$ represent assist ratios with values in the range [0,1]. For example, we can assign $s_d=1$ for full assist of an actuated degree of freedom and $s_d=0$ for no assist or for an unactuated degree of freedom.

B. Selective Compensation for External Forces Using the Principle of Virtual Work According to one embodiment of the present invention, a method of determining an equivalent joint torque that partially or completely compensates for selected external forces acting on a human-exoskeleton system is explained with reference to equations 17-21. An external force can be measured, for example, using sensors or force plates.

According to one embodiment of the present invention, the principle of virtual work can be used to determine an equivalent joint torque required to balance any Cartesian force, including gravitational forces as well as external forces. As explained with reference to equations 9-12 above, a Jacobian matrix can be constructed to transform a Cartesian force into an equivalent joint torque. Whereas the force vector due to gravity is three dimensional and nonzero only in the z direction, the external force vector can have as many as six nonzero elements, consisting of three force components as well as three moment components. According to one embodiment of the present invention, transformation of a six dimensional force/moment vector from Cartesian space to joint space comprises construction of a Jacobian matrix having translational as well as rotational components.

One embodiment of the invention described below determines an equivalent joint torque required to balance translational (force) components of an external force. According to a further embodiment, similar techniques can be used to determine an equivalent joint torque required to balance rotational (moment) components of an external force. Alternatively, rotational components can be left out of the calculations if they are unreliable.

Let $f_k$ represent the $k^{th}$ external force exerted on the system, where k=1 ... m. Let $p_k$ be a vector from the base frame to the application point of the $k_{th}$ external force. According to one embodiment, the differential kinematics of $p_k$ can be expressed as shown in equation 17, where the jacobian is defined by equation 18.

$$\dot{p}_k = J_{f_k} \dot{q} \quad (17)$$

$$J_{f_k} = \frac{\partial p_k}{\partial q} \quad (18)$$

According to one embodiment of the present invention, the equivalent joint torque vector required to balance the external force $f_k$ can be determined using equation 19.

$$T_{(k)}^T = f_k^T J_{f_k} \quad (19)$$

A further embodiment of the present invention determines joint torques required to balance the effects of multiple external forces from a set $k \in \lambda$ using equation 20. One embodiment of the present invention performs selective compensation for external forces, wherein set $\lambda$ includes a subset of the external forces acting on the human-exoskeleton system that are selected for compensation.

$$T_{(\lambda)}^T = \sum_{k \in \lambda} f_k^T J_{f_k} \quad (20)$$

Using techniques similar to those described above with reference to equations 15 and 16, one embodiment of the present invention determines the equivalent joint torques to partially compensate for one or more external forces in one or more degrees of freedom by pre-multiplying the equivalent joint torques that balance the external forces by a selection matrix $S_{ext}$ as shown in equation 21.

$$\tau_{a,ext} = S_{ext} T_{(\lambda)} \quad (21)$$

According to one embodiment of the present invention, equations 15 and 21 can be combined to determine 306 an equivalent joint torque for selective and/or partial compensation of gravity and external forces, as shown in equation 22.

$$\tau_a = S_{gr} G_{(\mu)} + S_{ext} T_{(\mu)} \quad (22)$$

As seen in equations 7-22, unlike conventional model-based control schemes, compensation for gravity as well as external forces according to one embodiment of the present invention is relatively robust to parametric uncertainties because it does not rely on full knowledge of the dynamic parameters such as segment inertias or joint friction. Further, embodiments of the present invention that use the principal of virtual work are capable of performing online or real-time control without the need for calculating unreliable first and second order time derivatives of noisy generalized coordinates.

One embodiment of the present invention for performing partial compensation has been described above with reference to equations 15, 16 and 21, wherein an equivalent joint torque required to compensate for one or more Cartesian forces is multiplied by a selection matrix. Another embodiment of the present invention performs partial compensation of a Cartesian force by multiplying the Cartesian force by one or more assist ratios before determining the equivalent joint torque required to compensate for the Cartesian force.

Figure 4:
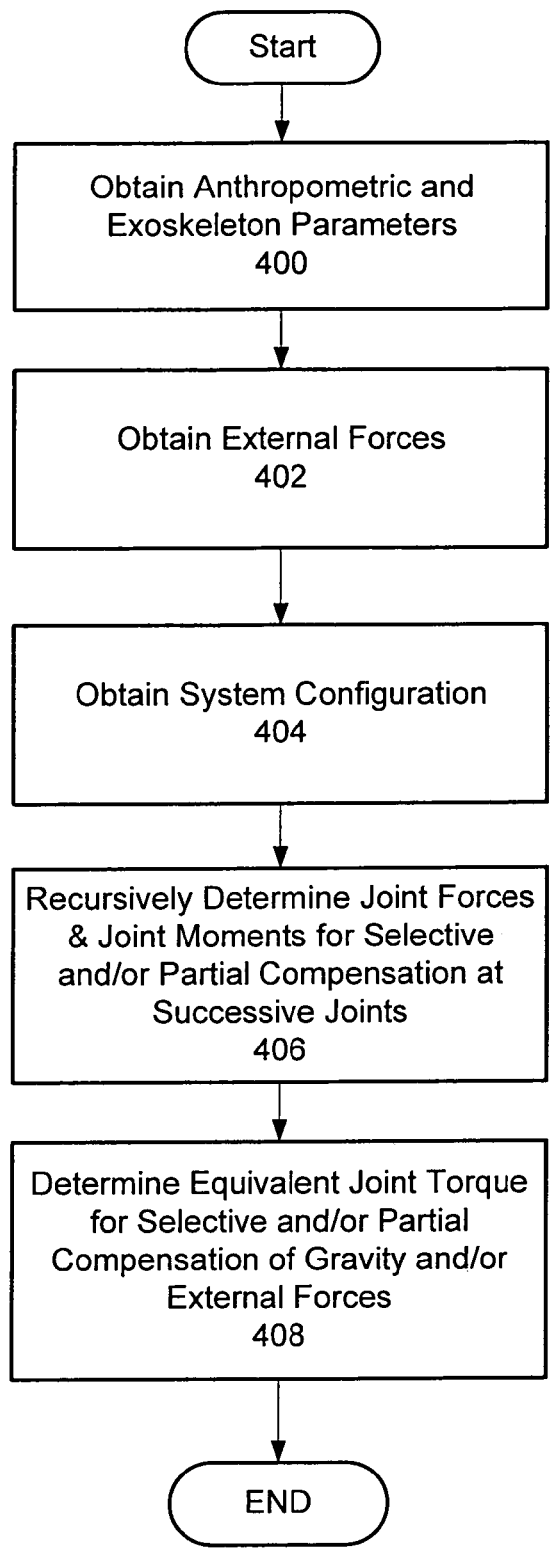
FIG. 4 is a flowchart illustrating a recursive method of determining an equivalent joint torque for selective and/or partial compensation of gravity and external forces acting on a human-exoskeleton system according to one embodiment of the present invention.

Selective Force Compensation Using Recursive Embodiments of a Human-Exoskeleton Controller FIG. 4 is a flowchart illustrating a recursive method of determining an equivalent joint torque for selective and/or partial compensation of gravity and external forces acting on a human-exoskeleton system according to one embodiment of the present invention. In describing recursive embodiments, all vectors are referred to the global coordinate system $\{O\}$, using the notation of leading superscript to indicate the referred frame. Recursive embodiments can be applied to open kinematic chains as well as closed kinematic chains.

Given the chainlike nature of a human-exoskeleton articulated body system, according to one embodiment of the present invention Newton-Euler Mechanics can be used to determine how gravity and external forces propagate from one segment to the next. For example, recursive embodiments can be used to solve for ankle or knee joint torques that compensate for ground reaction forces under the feet, wherein the joint torques are computed iteratively by first determining the ankle joint torque followed by the knee joint torque. According to one embodiment, recursive techniques can be used to determine the equivalent joint torques required to keep a human-exoskeleton system in static equilibrium.

According to one embodiment of the present invention, recursive calculation of joint forces and moments can be started at an end of the human-exoskeleton system that is close to a joint at which an equivalent joint torque is desired, thereby reducing the effects of model errors or uncertainty in measurement of body segment parameters.

According to one embodiment of the present invention, to determine forces required to maintain static equilibrium in a human-exoskeleton system, we consider each link in this structure assuming that no motion is allowed. The free body diagrams of one or more successive links in the structure can be considered and the force-moment balance relationships can be expressed using Newton-Euler Mechanics. Further, we can determine the torques to be applied about a joint axis for the manipulator to be in static equilibrium. Accordingly, we can solve for the joint torques needed to support gravitational forces and/or external forces.

The control torque required to generate motion can be relegated to muscle actuators that are activated by voluntary commands from the central nervous system; therefore, one embodiment of a recursive method of determining an equivalent joint torque for selective and/or partial compensation of gravitational or external forces does not account for the control torque required to generate the motion.

Referring to FIG. 4, one embodiment of a recursive method of determining an equivalent joint torque obtains 400 anthropometric and exoskeleton parameters to recursively determine the equivalent joint torque. Anthropometric and exoskeleton parameters may include body segment center of mass locations, joint locations with respect to a body segment's center of mass, and a body segment's mass. If external forces are being compensated for, measurements of the selected external forces and application points of the external forces are obtained 402 at each instant in time. The current system configuration can be obtained 404 by measuring or estimating generalized coordinates of the human-exoskeleton system. For example, the configuration of required degrees of freedom can be obtained 404 at each instant in time, which can be used to perform online or real time control of a human-exoskeleton system.

Referring to FIG. 1, according to one embodiment of the present invention, to compute the joint forces and moments that compensate for gravitational and/or external forces acting on a system with one or more body segments such as segment i 100, the equilibrium conditions for successive links are formulated, starting from the last link in each branch and working inward toward the root segment. One embodiment of the present invention recursively determines 406 joint forces and joint moments for selective and/or partial compensation of gravitational and/or external forces at successive joints using equations 23 and 24.

Equations 23 and 24 can be applied recursively at successive links of the human-exoskeleton system, starting with higher numbered links and moving towards lower numbered links. In one embodiment, equations 23 and 24 are used to determine joint forces and moments at a first joint before recursively determining joint forces and moments at a second joint. Alternatively, equation 23 can be used to determine joint forces at successive joints before recursively determining joint moments at the successive joints using equation 24.

$$°\Gamma_i = \left(\sum_{j \in c(i)}^{o} \Gamma_j\right) - a_i m_i g + \sum_k b_{i_k} °F_{i_k} \quad (23)$$

$$°N_i = \left(\sum_{j \in c(i)}^{o} °N_j + °L_{i,j} \times °\Gamma_j\right) - °L_{i,i} \times °\Gamma_i + \sum_k °L_{i,k} \times b_{i_k} °F_{i_k} \quad (24)$$

According to one embodiment of the present invention, equation 23 is used to recursively determine the joint force at joint $°C_i$ 120 to selectively compensate for gravitational and/or external forces acting on the human-exoskeleton system. In equation 23, the term $$\left(\sum_{j \in c(i)}^{o} \Gamma_j\right)$$

accounts for forces at joints adjacent to joint $°C_i$ 120, such as the forces at joint $°C_{j(1)}$ 130 and joint $°C_{j(2)}$ 140; the term $a_i m_i g$ accounts for the gravitational force acting at the center of mass 110 of segment i 100; and the term $$\sum_k b_{i_k} {}^o F_{i_k}$$

accounts for external forces acting on segment i 100.

According to one embodiment of the present invention, equation 24 is used to recursively determine the joint moment at joint $^o C_i$ 120 to selectively compensate for gravitational and/or external forces acting on the human-exoskeleton system. In equation 24, the term $$\left( \sum_{j \in c(i)} {}^o N_j + {}^o L_{i,j} \times {}^o \Gamma_j \right)$$

accounts for moments adjacent to joint $^o C_i$ 120, such as the moments at joint $^o C_{j(1)}$ 130 and joint $^o C_{j(2)}$ 140; the term $^o L_{i,i} \times {}^o \Gamma_i$ accounts for moment due to force $^o \Gamma_i$; and the term $$\sum_k {}^o L_{i,k} \times b_{i_k} {}^o F_{i_k}$$

accounts for moments due to external forces acting on segment i 100.

According to one embodiment of the present invention, $a_i$ and $b_{i_k}$ are diagonal assist ratio matrices for partial compensation of gravity and external forces respectively. The matrices $a_i$ and $b_{i_k}$ can, for example, have diagonal elements in the range [0,1], wherein a diagonal element with a value of 1 indicates the selected gravitational or external force is to be fully compensated, while a diagonal element with a value of 0 indicates the gravitational or external force is not to be fully compensated.

According to one embodiment of the present invention, equations 23 and 24 can be used for selectively compensation of Cartesian forces, including gravitational and external forces, acting on a human-exoskeleton system. Cartesian forces selected for compensation are included in the right hand side of equations 23 and 24 by premultiplying the relevant terms with matrices $a_i$ and $b_{i_k}$, while undesired forces can be excluded in equations 23 and 24 or pre-multiplied with matrices $a_i$ and $b_{i_k}$ having values of zero.

Suppose the axis of rotation of the exoskeleton actuator is in the unit direction defined by the vector $^o \hat{k}_i$. One embodiment of the present invention determines 408 the equivalent joint torque for selective and/or partial compensation of gravitational and/or external forces by taking the dot product of the joint axis vector with the moment couple obtained from Equation 24, as shown in equation 25.

$$\tau_{a_i} = {}^o N_i^{To} \hat{k}_i \quad (25)$$

According to one embodiment, other components of the coupling torque $^o N_i^T$ are either constrained by the joint structure or compensated by the torques generated through voluntary contraction of the muscles spanning the joint.

As seen in equations 23-25, unlike conventional model-based control schemes, compensation for Cartesian forces using recursive embodiments is relatively robust to parametric uncertainties because the computed assist torques do not depend on parameters such as body segment inertias and friction forces. Further, recursive embodiments of the present invention are capable of performing online or real-time control without the need for calculating unreliable first and second order time derivatives of noisy generalized coordinates.

Mechanical & Metabolic Feasibiltiy

Compensation for gravitational or external forces may degrade efficiency for certain tasks in which the natural dynamics of the system help the progression of motion. For example, human gait is believed to be an efficient motion due to the passive transfer of potential to kinetic energy from gravitational forces. The primary source of energy for hip flexion during the swing phase of gait is generated by gravity effects; therefore, compensation for such forces may in fact reduce efficiency. One embodiment of the present invention assesses mechanical and metabolic costs associated with a controller and determines analytical results that provide insight into relative feasibility. This analysis is helpful in determining which of gravitational and/or external forces in a human-exoskeleton system should be compensated to improve efficiency. Several controllers can be designed to complement each other, depending on efficiencies as well as stability.

According to one embodiment of the present invention, the mechanical energies can be used to quantify and describe the efficiencies associated with a controller. At the joint level, the product of net voluntary muscular moment, $\tau_m$, and the joint angular velocity, $\Omega$, can be used to describe the power generated by the muscles, as shown in equation 26.

$$P_m = \tau_m \Omega \quad (26)$$

Similarly, the net joint power can be described by equation 27.

$$P_n = \tau_n \Omega \quad (27)$$

Evaluation of power output at the joint level overlooks the presence of co-activation which has been experimentally confirmed to have a role in stabilizing the musculoskeletal system by enhancing the joint impedance. In other words, the power equations described in Equation 26 and 27 do not account for simultaneous generation of power by one muscle group and absorption by the antagonist group, or vice versa. According to one embodiment of the present invention, a more precise consideration of energy flow in the system can be obtained by considering the power contribution of individual muscles, which helps to determine appropriate algorithms for assist control. According to one embodiment of the present invention, if the muscle force and the rate of change of muscle length are known, the power contribution of an individual muscle, $p_m$, can be determined from equation 28. In equation 28, $f_m$ and $l$ represent muscle force and muscle velocity, respectively. It should be noted that the muscle power at the joint level is not equivalent to the sum of the power contribution of muscles that span it.

$$P_m = f_m l \quad (28)$$

Power is the rate of doing work. According to one embodiment of the present invention, in order to calculate work done, we can integrate power over a period of time. The work done by the voluntary muscular action during a period $t_o$ to $t_f$ can be determined using equation 29.

$$W_m = \int_{t_o}^{t_f} P_m dt \quad (29)$$

According to one embodiment of the present invention, the net mechanical work from the muscles and the assist actuators can be determined using equation 30.

$$W_n = \int_{t_o}^{t_f} P_m dt \quad (30)$$

The power $P_m$ and work $W_m$ can be either positive or negative. Positive work is work done during a concentric contraction, when the muscle moment acts in the same direction as the angular velocity of the joint. Concentric contractions occur when the muscle contraction permits the muscle to shorten. Negative work is work done during an eccentric contraction, when the muscle moment acts in the opposite direction to the movement of the joint. Eccentric action occurs when a muscle is activated, but is forced to lengthen due to a high external load.

It has been shown that eccentric contraction is metabolically more efficient than concentric contraction. See R. Wells, M. Morrisey, and R. Hughson, Internal and physiological responses during concentric and eccentric cycle ergometry, Eur. J. Appl. Physiol, 55:291-301, 1986; M. Gagnon and G. Smith, Muscular mechanical energy expenditure as a process for detecting potential risks in manual materials handling, J. Biomech., 24(3/4):191-203, November 1991, which are all incorporated by reference herein in their entirety. Further, a larger muscle tension can be created by the same activation level during eccentric action at a particular muscle length and velocity than during concentric action. According to one embodiment of the present invention, the metabolic cost (MC) of performing a task takes into account the efficiencies associated with positive and negative work, as shown in equation 31.

$$MC = \frac{W^+}{n^+} + \frac{W^-}{n^-} \tag{31}$$

In equation 31, $W^+$ represents concentric work, i.e. the work done when the muscles shorten, and $W^-$ represents eccentric work, i.e. the work done when the muscles lengthen. The constants $n^+$ and $n^-$ are the efficiencies associated with concentric and eccentric action, respectively. According to one embodiment of the present invention, at the muscle level, the total metabolic cost of synergistic action of m muscles can be obtained by integrating the instantaneous total power and considering the higher metabolic efficiency of eccentric action, as shown in equation 32.

$$MC = \int_{t_o}^{t_f} \left\{ \sum_{i=1}^{m} \left| \frac{P_{m_i}^+}{n^+} \right| + \left| \frac{P_{m_i}^-}{n^-} \right| \right\} dt \tag{32}$$

The computation of mechanical work or metabolic work may be unable to resolve the metabolic cost of isometric muscle action. In an unassisted human motion involving isometric contraction against gravity, mechanically there is no movement and therefore no mechanical work is done. However, metabolically there is a cost. The energy required to hold body segments against gravity cannot therefore be determined using the muscle power or joint power computations. Such energy is not negligible, for example, in work-related lifting or carrying tasks where loads are held momentarily against gravity or are carried with a forward body lean for extended periods. One embodiment of the present invention performs gravity compensation control, which intrinsically removes the metabolic costs associated with isometric contractions against gravity.

Feasibility of Assist Torque

According to one embodiment of the present invention, one criterion for determining the feasibility of an assist control algorithm is to consider the effect of the assist control on metabolic cost. Equation 3 and equation 26 can be combined to form equation 33.

$$P_m = (\tau_n - \tau_a)\Omega \tag{33}$$

If there is no assist, $\tau_a = 0$, muscle power is equal to the net joint power, as shown in equation 34.

$$P_m = P_n \tau_a = 0 \tag{34}$$

According to one embodiment of the present invention, we can consider the instantaneous assist torque to be metabolically feasible if the instantaneous metabolic cost of the assisted control is less than the instantaneous metabolic cost of unassisted control, as shown in equation 35. In equation 35, $n_m$ and $n_n$ represent the instantaneous metabolic efficiency, depending on whether the instantaneous power is positive or negative.

$$\frac{|P_m|}{n_m} < \frac{|P_n|}{n_n} \tag{35}$$

According to one embodiment of the present invention, the analysis can be simplified by considering only the mechanical cost of motion. By setting $n_m = n_n = 1$, equation 35 can be simplified to equation 36.

$$|\tau_m| < |\tau_n| \tag{36}$$

According to one embodiment of the present invention, in terms of mechanical energy, pursuant to equation 36 the design of assist control should be such that the magnitude of the assisted muscle torques does not exceed the magnitude of the unassisted muscle torque. According to one embodiment of the present invention, the inequality constraint in equation 36 can be expressed in terms of the assist torque $\tau_a$ as shown in equations 37-38. Equation 37 follows from equation 3.

$$|\tau_m| = |\tau_n - \tau_a| \tag{37}$$

Substituting equation 37 into Equation 36 yields equation 38.

$$|\tau_n - \tau_a| < |\tau_n| \tag{38}$$

According to one embodiment of the present invention, a necessary and sufficient condition to satisfy equation 38 is to apply an assist torque that satisfies the inequality constraint shown in equation 39. Therefore, a controller is mechanically efficient if the condition in equation 39 is satisfied.

$$0 < \tau_a < 2\tau_n, \tau_n > 0$$

$$2\tau_n < \tau_a < 0, \tau_n < 0 \tag{39}$$

Figure 5:
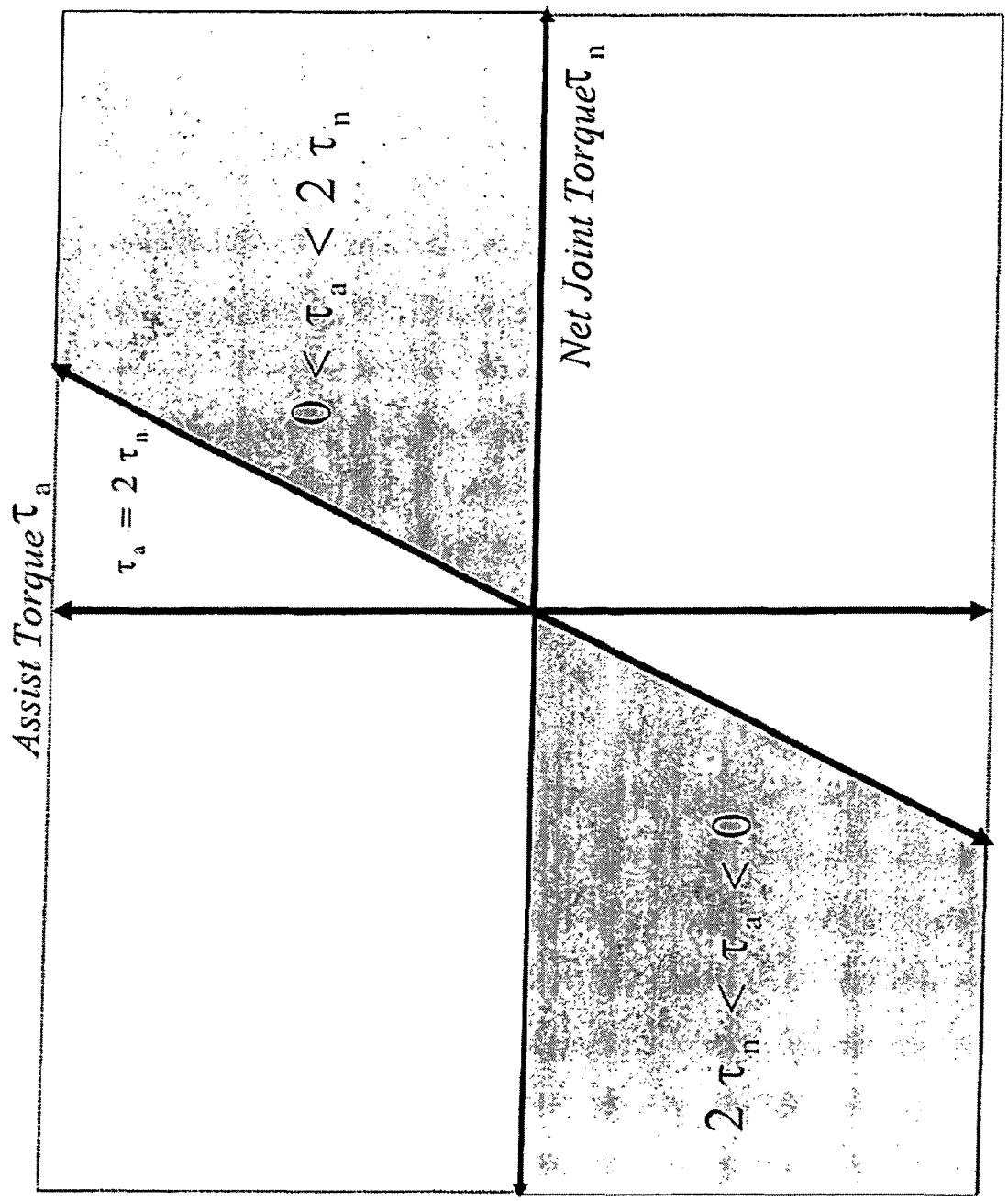
FIG. 5 is a graph illustrating feasibility regions for a mechanically efficient human-exoskeleton controller according to one embodiment of the present invention.

According to one embodiment of the present invention, FIG. 5 shows the feasibility region for a mechanically efficient controller that satisfies the criteria in equation 39. If the plot of the assist torque versus the net joint torque lies within the feasibility region, the net muscle power at a joint using an assisted human motion is less that an unassisted muscle power. Therefore, we say the controller is efficient in terms of mechanical power consumption.

Determining metabolic feasibility can be more complicated than its mechanical counterpart because each muscle may have a different efficiency index. Although the efficiency index can be approximated by a constant number, in reality the efficiency index may be a nonlinear function of muscle parameters and system state variables. Furthermore, these indices may vary from person to person. Ideally, the metabolic cost of assisted joint motion should not exceed the metabolic cost of the unassisted joint motion. According to one embodiment of the present invention, the expression for calculating metabolic cost is given by equation 32 and the metabolic feasibility region can be constructed from this equation.

According to one embodiment of the present invention, other criteria that can be considered for determining the feasibility of an assist control algorithm include stability and equilibrium maintenance. The loss of stability causes the body to do much to regain its balance, which can be referred to as an equilibrium reaction and which often occurs at the expense of other motor skills such as minimizing mechanical and metabolic energy. A countermeasure to loss of stability can be one that forces the mechanisms responsible for maintaining equilibrium to employ the musculature to regain balance through body control. Evidence of stability taking precedence over energy consumption is found in increased joint stabilization by co-contraction of antagonistic muscle pairs. The relative importance of stability can also be subject specific and task specific. For example, stability may be more important for the elderly than for young adults.

According to one embodiment of the present invention, feasibility experiments can be performed off-line for selected tasks. Based on the feasibility results for one or more selected tasks, we can determine which gravitational or external force components should be compensated to provide efficient online exoskeleton control.

Simulation Results for an Ankle Foot Orthosis

One embodiment of the present invention uses an ankle-foot orthosis (AFO) that is used to provide support, stability, or replacement of lost function to the ankle. AFOs can be utilized to resolve various problems related to biomechanics of the lower extremities by compensating for muscle weakness in the foot and ankle and providing stability. AFOs can aid several functions in ambulation, including control of dorsiflexion/plantarflexion in both the stance and swing phases of gait, and they can also be used to stabilize the ankle in the frontal and transverse planes during balance and gait activities. In a recently developed AFO, the impedance of the orthotic joint was modulated throughout the walking cycle to treat drop foot gait. See Joaquin A. Blaya, Force-controllable ankle foot orthosis (AFO) to assist drop foot gait, Master's thesis, Massachusetts Institute of Technology, 2003, which is incorporated by reference herein in its entirety. It was found that actively adjusting joint impedance reduces the occurrence of slap foot, allows greater powered plantar flexion, and provides for greater biological realism in swing phase ankle dynamics. Ankle orthotics can also be useful after an acute ankle injury, for rehabilitation, to prevent ankle re-injury, for fall prevention in the elderly, and for chronically unstable ankles. One embodiment of the present invention can be used to control an active AFO.

Standard gait measurements including motion capture and force plate data were obtained courtesy of Christopher L. Vaughan, Brian Davis, and Jeremy C. O'Connor, Dynamics of Human Gait, Kiboho Publishers, Cape town South Africa, 2d ed., 1999, which is incorporated by reference herein in its entirety. The recorded motion from a Helen Hayes marker set and a series of anthropometric measurements were used as inputs to a set of statistical regression equations to determine the foot segment parameters and ankle joint center. The method proposed in Grood & Suntay was used to determine the platerflexion/dorsiflexion axis of rotation. See E. S. Grood and W. J. Suntay, A joint coordinate system for the clinical description of three dimensional motions: Application to the knee, Journal of Biomechanical Engineering, 105:136-144, 1983, which is incorporated by reference herein in its entirety.

For purposes of this simulation, the axis of rotation of the ankle orthosis is assumed to coincide with the estimated platerflexion/dorsiflexion axis. The ground reaction force and moment vector measured from the force plate has three force components and one moment component in the direction perpendicular to the plane of the force plate. The vertical component of the ground reaction force was used in the simulations. The tangential forces and all moment components were set to zero to model sensors that may be used for exoskeleton applications, such as an in-shoe foot pressure and force sensor which can accurately estimate the vertical component of the ground reaction force. According to one embodiment of the present invention, by neglecting the shear components and the reaction moment, the recursive computations of the assist torque using equations 23 and 25 resembles a controller that compensates for gravity. However, while pure gravity compensation only accounts for the static vertical ground reaction force, most reaction force sensors incorporate the dynamic components.

The net planterflexion/dorsiflexion torque can be computed using an inverse dynamics procedure, and represents the totality of the muscle torque and the assist torque about the flexion/extension. Assuming an ideal model and perfect sensory information with which the net joint torque is computed, $\tau_n$ can be regarded as the "gold standard" torque. According to one embodiment of the present invention, the net torque, In, and the assist torque, $\tau_a$, about the planterflexion/dorsiflexion axis computed using Equations 23 and 25 are plotted in FIG. 6.

Figure 7A:
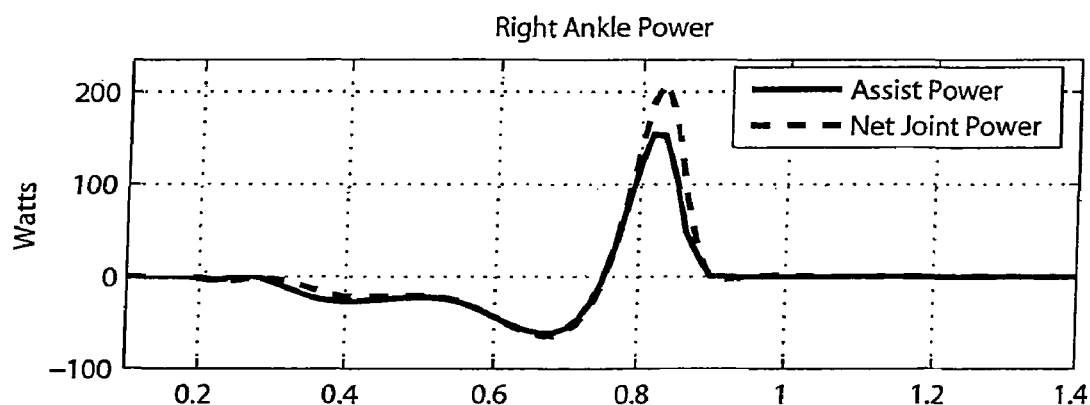
FIG. 7A is a graph comparing the net ankle joint power versus the ankle assist actuator power during a simulated cycle of gait according to one embodiment of the present invention.
Figure 7B:
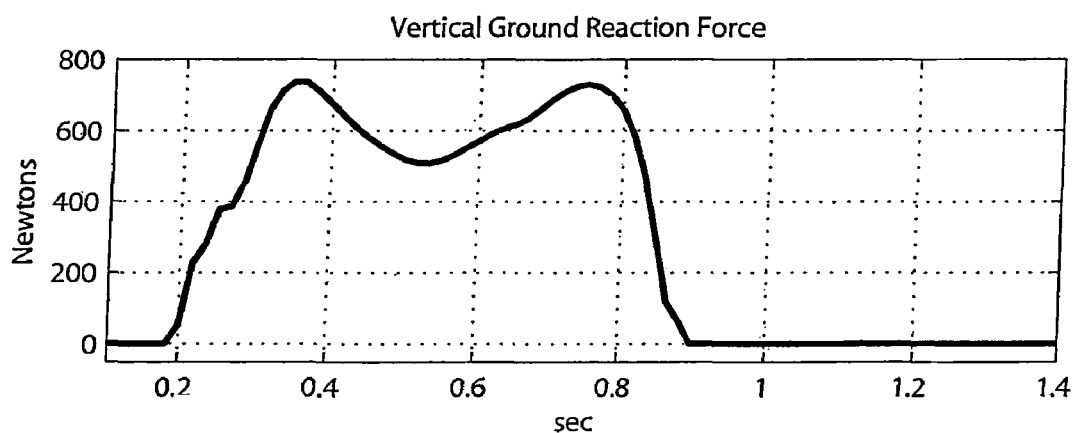
FIG. 7B is a graph showing the vertical component of the ground reaction force during a simulated cycle of gait according to one embodiment of the present invention.

According to one embodiment of the present invention, the net ankle joint power, the ankle assist actuator power, and the vertical component of the ground reaction force are shown in FIG. 7. FIG. 7A is a graph comparing the net ankle joint power versus the ankle assist actuator power during a simulated cycle of gait according to one embodiment of the present invention. FIG. 7B is a graph showing the vertical component of the ground reaction force during a simulated cycle of gait according to one embodiment of the present invention.

Figure 6:
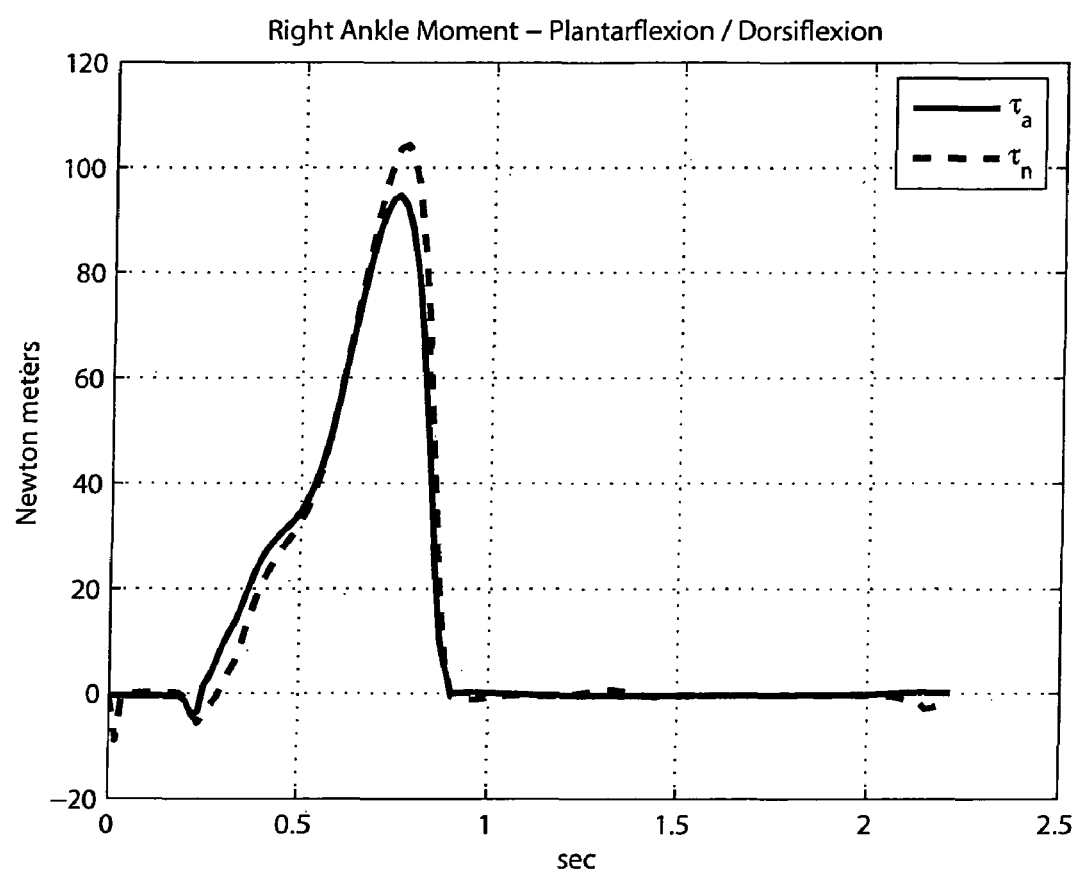
FIG. 6 is a graph comparing the net joint torque versus the ankle assist torque for plantarflexion/dorsiflexion of the ankle during a simulated cycle of gait according to one embodiment of the present invention.

In this gait simulation according to one embodiment of the present invention, heel strike occurs at approximately t=0.2 seconds, at the time when the vertical ground reaction force in FIG. 7B goes from zero to a positive number. Toe-off occurs at approximately t=0.9 seconds, the time when the vertical ground reaction force returns to zero. FIG. 6 illustrates that, according to one embodiment of the present invention, the assist torque accounts for the majority of the total torque required during this task. Furthermore, as shown in FIG. 7A and 7B, according to one embodiment of the present invention the assist torques can contribute to the majority of the power required to decelerate the body during heel strike as well as the majority of propulsive power required during toe-off.

Figure 8:
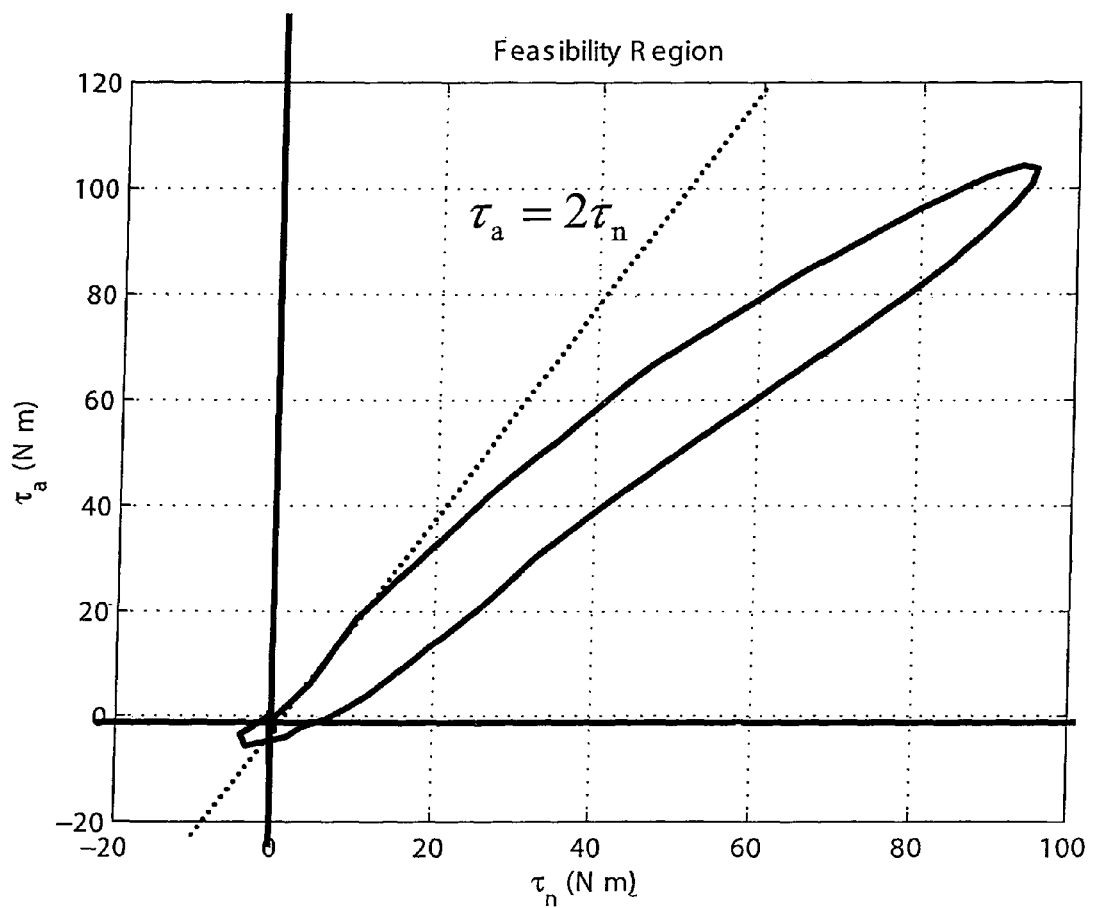
FIG. 8 is a graph showing the ankle assist torque versus the net joint torque at the ankle during a simulated cycle of gait, compared with mechanical feasibility regions of a human-exoskeleton controller, according to one embodiment of the present invention.

FIG. 8 is a graph showing the ankle assist torque versus the net joint torque at the ankle during a simulated cycle of gait, compared with mechanical feasibility regions, according to one embodiment of the present invention. FIG. 8 illustrates that a controller according to one embodiment of the present invention falls within the mechanical feasibility region for nearly the entire duration of the gait cycle. Therefore, the power generated by the assist actuators' is in the same direction as the net power generated.

One embodiment of the present invention provides a system for automatically controlling an exoskeleton actuator at a joint of a segment in a human-exoskeleton system, comprising first receiving means for receiving a system parameter for the human-exoskeleton system, second receiving means for receiving a generalized coordinate for the human-exoskeleton system, and first determining means for determining an equivalent joint torque for the exoskeleton actuator at the joint to compensate for a selected force. According to one embodiment of the present invention, the first determining means includes second determining means for determining the equivalent joint torque for the exoskeleton actuator at the joint to maintain static equilibrium. According to one embodiment of the present invention, the first determining means includes second determining means for determining the equivalent joint torque for partial compensation of the selected force for one or more degrees of freedom. According to one embodiment of the present invention, the system also includes comprises means for obtaining a selection matrix comprising an element representing an assist ratio for partial compensation of a degree of freedom, and second determining means for determining an assist torque for partial compensation of the degree of freedom. According to one embodiment of the present invention, the system also includes second determining means for determining the feasibility of the system for controlling the exoskeleton actuator.

The present invention may be embodied in various forms and should not be construed as limited to the embodiments set forth herein. Rather, these embodiments are provided so that disclosure will be thorough and complete and will fully convey the invention to those skilled in the art. Further, the apparatus and methods described are not limited to rigid bodies.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without department from the spirit and scope of the invention as it is defined in the appended claims.

What is claimed is:

1. A computer based method of controlling an exoskeleton actuator at a joint of a segment in a human-exoskeleton system, comprising:
    receiving a system parameter for the human-exoskeleton system;
    receiving a coordinate for the human-exoskeleton system in a coordinate system;
    determining an equivalent joint torque of the joint for the exoskeleton actuator at the joint to compensate for a selected force;
    determining a feasibility of the equivalent joint torque based on whether an instantaneous metabolic cost when the equivalent joint torque is applied to the exoskeleton actuator is less than the instantaneous metabolic cost without applying the equivalent joint torque to the exoskeleton actuator; and
    controlling the exoskeleton actuator based on the equivalent joint torque and the feasibility of the equivalent joint torque.

2. The method of claim 1, wherein determining the equivalent joint torque of the joint for the exoskeleton actuator at the joint to compensate for the selected force comprises:
    selecting a force acting on the human-exoskeleton system for compensation; and
    determining the equivalent joint torque of the joint for the exoskeleton actuator at the joint to compensate for the selected force.

3. The method of claim 1, wherein the selected force acts at one of:
    a segment connected to the joint; and
    a segment that is not connected to the joint.

4. The method of claim 1, wherein the selected force comprises one of:
    a gravitational force; and
    an external force.

5. The method of claim 4, wherein the external force comprises one of a reaction force, an applied force, an interaction force, a contact force, and a static load.

6. The method of claim 1, wherein determining the equivalent joint torque of the joint for the exoskeleton actuator at the joint to compensate for the selected force comprises determining the equivalent joint torque of the joint for the exoskeleton actuator at the joint to maintain static equilibrium.

7. The method of claim 1, wherein determining the equivalent joint torque of the joint for the exoskeleton actuator at the joint to compensate for the selected force comprises determining the equivalent joint torque of the joint for partial compensation of the selected force for one or more degrees of freedom.

8. The method of claim 1, further comprising:
    obtaining a selection matrix comprising an element representing an assist ratio for partial compensation of a degree of freedom; and
    determining an assist torque for partial compensation of the degree of freedom.

9. The method of claim 1, wherein determining the equivalent joint torque of the joint for the exoskeleton actuator at the joint to compensate for the selected force comprises:
    determining an equivalent joint torque of a last joint in a branch of the human-exoskeleton system; and
    recursively determining an equivalent joint torque of a successive joint adjacent to the joint of which the equivalent joint torque was just determined based on said just determined equivalent joint torque.

10. The method of claim 1, wherein determining the equivalent joint torque of the joint for the exoskeleton actuator at the joint to compensate for the selected force comprises:
    determining a joint moment at an end joint of a branch of the human-exoskeleton system;
    recursively determining a joint moment at a successive joint adjacent to the joint of which the joint moment was just determined based on said just determined joint moment until the joint moment of the joint of the segment is determined.

11. The method of claim 1, wherein the equivalent joint torque is determined from a dynamics equation of motion.

12. The method of claim 1, wherein the selected force is a gravitational force acting on the human-exoskeleton system, and wherein determining the equivalent joint torque to compensate for the gravitational force comprises determining a rate of change of potential energy of the human-exoskeleton system.

13. The method of claim 1, wherein the equivalent joint torque is determined using the principle of virtual work.

14. The method of claim 1, wherein determining the equivalent joint torque of the joint for the exoskeleton actuator at the joint to compensate for the selected force comprises constructing a Jacobian matrix to transform the selected force to the equivalent joint torque.

15. The method of claim 1, wherein determining the feasibility of the equivalent joint torque comprises determining whether the equivalent joint torque, when applied to the exoskeleton actuator, enhances or degrades stability of the human-exoskeleton system.

16. The method of claim 1, further comprising determining whether the equivalent joint torque is mechanically efficient.

17. The method of claim 1, wherein the selected force is selected for compensation based on an efficiency associated with the exoskeleton actuator.

18. The method of claim 1, wherein the joint is an ankle joint and wherein the human-exoskeleton system comprises an ankle-foot orthosis.

19. A computer based method of controlling an exoskeleton actuator at a joint of a segment in a human-exoskeleton system, comprising:
    receiving a system parameter for the human-exoskeleton system;
    receiving a coordinate for the human-exoskeleton system in a coordinate system;
    determining an assist torque of the joint for the exoskeleton actuator at the joint to compensate for a selected force;
    determining a feasibility of the assist torque, comprising:
        determining, for a positive net joint torque, whether the assist torque has a value greater than zero and less than twice the net joint torque, and
        determining, for a negative net joint torque, whether the assist torque has a value less than zero and greater than twice the net joint torque; and
    controlling the exoskeleton actuator based on the assist torque and the feasibility of the assist torque.

20. A system for automatically controlling an exoskeleton actuator at a joint of a segment in a human-exoskeleton system, comprising:
    a computer processor; and
    a non-transitory computer-readable storage medium storing executable computer program code for:
        receiving a system parameter for the human-exoskeleton system,
        receiving a coordinate for the human-exoskeleton system in a coordinate system,
        determining an equivalent joint torque of the joint for the exoskeleton actuator at the joint to compensate for a selected force,
        determining a feasibility of the equivalent joint torque based on whether an instantaneous metabolic cost when the equivalent joint torque is applied to the exoskeleton actuator is less than the instantaneous metabolic cost without applying the equivalent joint torque to the exoskeleton actuator, and
        controlling the exoskeleton actuator based on the equivalent joint torque and the feasibility of the equivalent joint torque.

21. The system of claim 20, wherein determining the equivalent joint torque of the joint for the exoskeleton actuator at the joint to compensate for the selected force comprises includes determining the equivalent joint torque of the joint for the exoskeleton actuator at the joint to maintain static equilibrium.

22. The system of claim 20, wherein determining the equivalent joint torque of the joint for the exoskeleton actuator at the joint to compensate for the selected force comprises determining the equivalent joint torque of the joint for partial compensation of the selected force for one or more degrees of freedom.

23. The system of claim 20, wherein the non-transitory computer-readable storage medium further stores executable computer program code for:
    obtaining a selection matrix comprising an element representing an assist ratio for partial compensation of a degree of freedom; and
    determining an assist torque for partial compensation of the degree of freedom.

24. The system of claim 20, wherein the joint is an ankle joint and wherein the human-exoskeleton system comprises an ankle-foot orthosis.

* * * * *

UNITED STATES PATENT AND TRADEMARK OFFICE
CERTIFICATE OF CORRECTION

PATENT NO. : 7,774,177 B2 Page 1 of 1
APPLICATION NO. : 11/395654
DATED : August 10, 2010
INVENTOR(S) : Behzad Dariush It is certified that error appears in the above-identified patent and that said Letters Patent is hereby corrected as shown below:

Column 24, line 20, after "selected force comprises", delete "includes".

Signed and Sealed this

Second Day of November, 2010

David J. Kappos
*Director of the United States Patent and Trademark Office*